(12) United States Patent
Ushiyama et al.

(10) Patent No.: US 8,794,799 B2
(45) Date of Patent: Aug. 5, 2014

(54) OPTICAL SHEET, SURFACE LIGHT SOURCE DEVICE AND TRANSMISSION-TYPE DISPLAY DEVICE

(75) Inventors: Akinobu Ushiyama, Moriya (JP); Akiko Tomita, Mihara (JP); Satoshi Goishihara, Kazo (JP); Hiroshi Kojima, Kawagoe (JP); Takayuki Shimada, Saitama (JP); Mitsuhiro Hamashima, Shinjuku-Ku (JP); Kazuo Matsufuji, Nerima-Ku (JP); Kazuki Tanaka, Kita-Ku (JP)

(73) Assignee: Dai Nippon Printing Co., Ltd., Shinjuku-Ku (JP)

( * ) Notice: Subject to any disclaimer, the term of this patent is extended or adjusted under 35 U.S.C. 154(b) by 0 days.

(21) Appl. No.: 13/504,600

(22) PCT Filed: Oct. 29, 2010

(86) PCT No.: PCT/JP2010/069342
§ 371 (c)(1),
(2), (4) Date: Apr. 27, 2012

(87) PCT Pub. No.: WO2011/052739
PCT Pub. Date: May 5, 2011

(65) Prior Publication Data
US 2012/0224380 A1    Sep. 6, 2012

(30) Foreign Application Priority Data

Oct. 30, 2009   (JP) .............................. 2009-250266
Feb. 3, 2010    (JP) .............................. 2010-022316

(51) Int. Cl.
*F21V 5/02*       (2006.01)
(52) U.S. Cl.
USPC ............ 362/339; 362/606; 362/608; 349/62; 349/64; 349/65; 359/599; 359/831; 359/837

(58) Field of Classification Search
USPC ............ 362/606, 339, 311, 362, 608; 349/62, 349/64, 65; 359/599, 831, 837
See application file for complete search history.

(56) References Cited

U.S. PATENT DOCUMENTS 7,529,048 B2 *   5/2009   Lin .............................. 359/831
7,618,164 B2 *  11/2009   Wang et al. ................... 362/339

(Continued)

FOREIGN PATENT DOCUMENTS

JP      2004-038155 A1    2/2004
JP      2005-099803 A1    4/2005

(Continued)

OTHER PUBLICATIONS

International Search Report dated Jan. 25, 2011.
Japanese Office Action dated Jan. 18, 2013 (with English translation).
Chinese Office Action (Application No. 201080049681.0) dated Oct. 30, 2013.

*Primary Examiner* — Anh Mai
*Assistant Examiner* — Kevin Quarterman
(74) *Attorney, Agent, or Firm* — Burr & Brown, PLLC

(57) ABSTRACT

An optical sheet having both of an excellent light condensing function and an excellent scratch resistance is provided. An optical sheet includes: a sheet-like main body; at least three or more first unit shaped elements arranged on one surface of the main body; and second unit shaped elements arranged on the one surface of the main body. Each of the second unit shaped elements extend in parallel with in one direction on a sheet surface of the main body. A height H1 of each of the first unit shaped elements from the one surface is higher than a height H2 of each of the second unit shaped elements. A rate of an area occupied by the first unit shaped elements on the one surface is not more than 10.0%, when observed along a normal direction nd relative to the one surface.

7 Claims, 6 Drawing Sheets

(56) References Cited

U.S. PATENT DOCUMENTS

| | | | |
|---|---|---|---|
| 2003/0214720 A1 | 11/2003 | Bourdelais et al. | |
| 2005/0069678 A1 | 3/2005 | Olczak et al. | |
| 2005/0147374 A1* | 7/2005 | Gardiner | 385/146 |
| 2005/0174803 A1 | 8/2005 | Hayashi et al. | |
| 2005/0243575 A1* | 11/2005 | Kunimochi | 362/606 |
| 2005/0280752 A1* | 12/2005 | Kim et al. | 349/62 |
| 2006/0072342 A1* | 4/2006 | Kim et al. | 362/620 |
| 2006/0146571 A1* | 7/2006 | Whitney | 362/615 |
| 2009/0316072 A1 | 12/2009 | Okumura et al. | |
| 2010/0066942 A1 | 3/2010 | Teragawa | |
| 2010/0302479 A1* | 12/2010 | Aronson et al. | 349/64 |

FOREIGN PATENT DOCUMENTS

| | | |
|---|---|---|
| JP | 1646855 A1 | 7/2005 |
| JP | 2007-335323 A1 | 12/2007 |
| JP | 2008-070456 A1 | 3/2008 |
| JP | 2008-112611 A1 | 5/2008 |
| WO | 2008/056473 A1 | 5/2008 |

* cited by examiner

OPTICAL SHEET, SURFACE LIGHT SOURCE DEVICE AND TRANSMISSION-TYPE DISPLAY DEVICE

BACKGROUND OF THE INVENTION

1. Field of the Invention

The present invention relates to an optical sheet having an excellent light collecting (condensing) function and an excellent scratch resistance. In addition, the present invention relates to a surface light source device and a transmission-type display device, having such an excellent optical sheet.

2. Description of Related Art

In general, a surface light source device used for a transmission-type display device includes a light source, and a plurality of optical sheets (optical films) that can serve to change a travel direction of light emitted from the light source. For example, as disclosed in FIG. 1 of JP2008-70456A, included in the plurality of optical sheets are a light diffusing sheet that can serve to diffuse the light emitted from the light source, thus shading an image of the light source (rendering the light source image inconspicuous or substantially invisible), and a light collecting sheet (light condensing sheet) that has a function for collecting (condensing) the light travel direction in a front direction, thereby enhancing the front brightness (light collecting function or light condensing function).

As the light collecting sheets, the optical sheets, including unit shaped elements (unit optical elements) extending along a line and arranged orthogonally to the longitudinal direction of each element (this arrangement manner is a so-called "linear arrangement"), are widely used. Typically, each of the unit shaped elements has a ridgeline portion (vertex extending along a straight line) in the longitudinal direction thereof, and has a shape corresponding to a part of a triangular, elliptical or circular shape in a cross section orthogonal to the longitudinal direction.

When the optical sheet including the unit shaped elements extending along a line is incorporated in a transmission-type display device, the optical sheet is superposed on another member such as another optical sheet or the like. In addition, before being incorporated into the transmission-type display device, the optical sheet is sometimes handled (e.g., transported) as a member in the form of multiple overlapped sheets which have been cut into a final shape, or as a member in the form of a wound web-like sheet which is not yet cut into the final shape. Under these conditions, each of the unit shaped elements of the optical sheet is locally in contact with another member, at a narrow area of the linearly extending ridgeline portion. Thus, when there generate slight vibrations or external forces while the display device and the optical sheet are handled, stress may concentrate on the ridgeline portion, resulting in a deformation of the unit shaped element.

In particular, when the optical sheets in their own are transported or when a display device including an optical sheet and another member is transported, there is a possibility that the adjacent optical sheets (or the optical sheet and the other member adjacent thereto) are repeatedly displaced relative to each other, while being pressed on each other. As a result, the surface of the optical sheet on which the unit shaped elements are formed may have visible scratches. Such disadvantage is remarkably likely to occur in the case of unit shaped elements (unit prisms) having a triangular cross-sectional shape, which can exert an excellent light collecting function.

In the optical sheet disclosed by JP2008-70456A, by partially projecting an inclined surface of each of the unit shaped elements having a triangle columnar prism shape, a hemispherical curved lens is disposed on the inclined surface. In particular, FIGS. 4 and 9(c) of JP2008-70456A disclose that a hemispherical curved surface 12G is formed so as to cover the vertex of the triangular cross section. Due to the provision of such a curved surface 12G, the vertex of each of the unit shaped elements having the triangular cross-sectional shape, which tends to be deformed, can be prevented from being directly in contact with another member adjacent to the optical sheet. Thus, a contact resistance of the optical sheet can be possibly enhanced.

According to the disclosure of JP2008-70456A, the curved surface can provide a light diffusing function to the optical sheet. In view of the paragraphs 0036, 0059 and 0060 of JP2008-70456A, there is described only the fact that the optical function (mainly the light collecting function) of the part, which has the triangular cross-sectional shape, of the unit shaped element (prism body), and the optical function (mainly the light diffusing function) of the other part, which is provided with the curved surface, of the unit shaped element, are exhibited independently of each other. That is to say, from the technique disclosed in JP2008-70456A, it cannot be expected to obtain some combined effect of the optical function of the part having the triangular cross-sectional shape and the optical function of the part provided with the curved surface.

Further, in JP2008-70456A, the projected curved surfaces are arranged on the unit shaped elements having a triangle columnar shape, along a direction in which the unit shaped elements extend. Thus, at positions of the projected curved surfaces, the light collecting function of the inclined surfaces of the triangle column is inhibited. In addition, since a part of the hemispherical surface is cut by the triangle column, the light diffusing function of the hemispherical surface is impaired. That is to say, although the optical sheet disclosed in JP2008-70456A has the light collecting function and the light diffusing function, the light collecting function is inferior to that of a perfect triangle columnar prism linear array, as well as the light diffusing function is inferior to that of a so-called fly-eye lens in which only hemispherical curved surfaces are arranged. Accordingly, depending on the weighting balance between the light condensing function and the light diffusing function, the rate of the area that is occupied by such a projected curved surface relative to the whole surface of the unit shaped elements will be controlled. Namely, from the disclosure of JP2008-70456A, it is understood that the provision of the projected curved surface deteriorates the light collecting function of the unit shaped element (prism body itself) having a triangle cross-sectional shape, which causes lowering of the front brightness. Therefore, although the scratch resistance of the optical sheet of JP2008-70456A might be enhanced, such enhancement can be obtained at the sacrifice of the light collecting function.

SUMMARY OF THE INVENTION

The present invention has been made in view of the above circumstances. The object of the present invention is to provide an optical sheet having both of an excellent light condensing (collecting) function and an excellent scratch resistance, as well as keeping a light diffusing at a certain degree. In addition, the object of the present invention is to provide a surface light source device and a transmission-type display device which can effectively prevent a defect caused by a contact between members incorporated therein, while assuring an excellent brightness in a front direction.

The optical sheet according to one embodiment of the present invention comprises:

a sheet-like main body;

at least three or more first unit shaped elements arranged on one surface of the main body; and second unit shaped elements arranged on the one surface of the main body, each extending in parallel with one direction on a sheet surface of the main body;

wherein:

a height of each of the first unit shaped elements from the one surface is higher than a height of each of the second unit shaped elements; and a rate of an area occupied by the first unit shaped elements on the one surface is not more than 10.0%, when observed along a normal direction relative to the one surface.

In the optical sheet according to the embodiment of the present invention, the first unit shaped elements may be arranged on the one surface of the main body, with an interval or a gap provided therebetween, and the second unit shaped elements may be arranged between the first unit shaped elements on the one surface of the main body.

In addition, in the optical sheet according to the embodiment of the present invention, the second unit shaped elements may be arranged on an area of the one surface on which the first unit shaped elements are not arranged.

Further, in the optical sheet according to the one embodiment of the present invention, a part of an area of the one surface of the main body may be covered with the first unit shaped elements, and all the remaining area, excluding the part of the area, of the one surface of the main body may be covered with the second unit shaped elements.

Further, in the optical sheet according to the embodiment of the present invention, each of the first unit shaped elements may have a shape corresponding to a part of an ellipse or to a part of a circle, in a section thereof parallel with the normal direction relative to the sheet surface of the main body.

Further, in the optical sheet according to the embodiment of the present invention, each of the first unit shaped elements may have a shape corresponding to a part of an ellipse or to a part of a circle, and a width of each of the first unit shaped elements along the one surface may have a length larger than a height of each of the first unit shaped elements, in a section thereof parallel with the normal direction relative to the sheet surface of the main body and orthogonal to the one direction.

Further, in the optical sheet according to the embodiment of the present invention, each of the first unit shaped elements may include a shape corresponding to a part of an ellipse or to a part of a circle, in a section thereof parallel with the normal direction relative to the sheet surface of the main body and orthogonal to the one direction.

Further, in the optical sheet according to the embodiment of the present invention, each of the second unit shaped elements may have a triangular shape, in a section thereof parallel with the normal direction relative to the sheet surface of the main body and orthogonal to the one direction.

Further, in the optical sheet according to the embodiment of the present invention, each of the first unit shaped elements may have a shape corresponding to a part of a spheroid, or a shape corresponding to a part of a sphere.

Further, in the optical sheet according to the embodiment of the present invention, an average of the least interval between the first unit shaped elements, which is an average of the distance, along the sheet surface of the main body, between one of the first unit shaped elements and the other one of the first unit shaped elements positioned nearest to the one first unit shaped element along the sheet surface of the main body, may be equal to or greater than an arrangement pitch of the second unit shaped elements in a direction orthogonal to the one direction on the sheet surface of the main body. In such an optical sheet according to the present invention, the first unit shaped elements may be arranged with a constant pitch along a first direction on the sheet surface of the main body, and may be arranged with a constant pitch along a second direction on the sheet surface of the main body. The first direction may be orthogonal to the one direction, and may cross to the second direction while defining a 60° angle therebetween. Alternatively, in such an optical sheet according to the present invention, the first unit shaped elements may be arranged in a random manner, on the one surface of the main body.

The surface light source device according to one embodiment of the present invention comprises: a light source; and one of the optical sheets according to the aforementioned embodiments of the present invention, the one of the optical sheets being arranged to receive light emitted from the light source.

The surface light source device according to the embodiment of the present invention may further include a light condensing sheet having unit shaped elements having a triangular cross-sectional shape.

In addition, the surface light source device according to the embodiment of the present invention may further comprise a polarized-light separating film located on a light outgoing side relative to the optical sheet.

A transmission-type display device according to one embodiment of the present invention comprises: a transmission-type display unit; and one of the surface light source devices according to the aforementioned embodiments disposed to be opposed to the transmission-type display unit.

According to the present invention, both of an excellent light collecting function and an excellent scratch resistance can be provided to an optical sheet.

DETAILED DESCRIPTION OF THE INVENTION

Hereinafter, an embodiment of the present invention will be described with reference to the drawings. In these drawings, each part and/or member is schematically shown, and proper alteration and exaggeration from real things, in sizes, scales and the like, in both of the vertical and horizontal directions, are utilized for better understanding and clarity of the invention.

Figure 1:
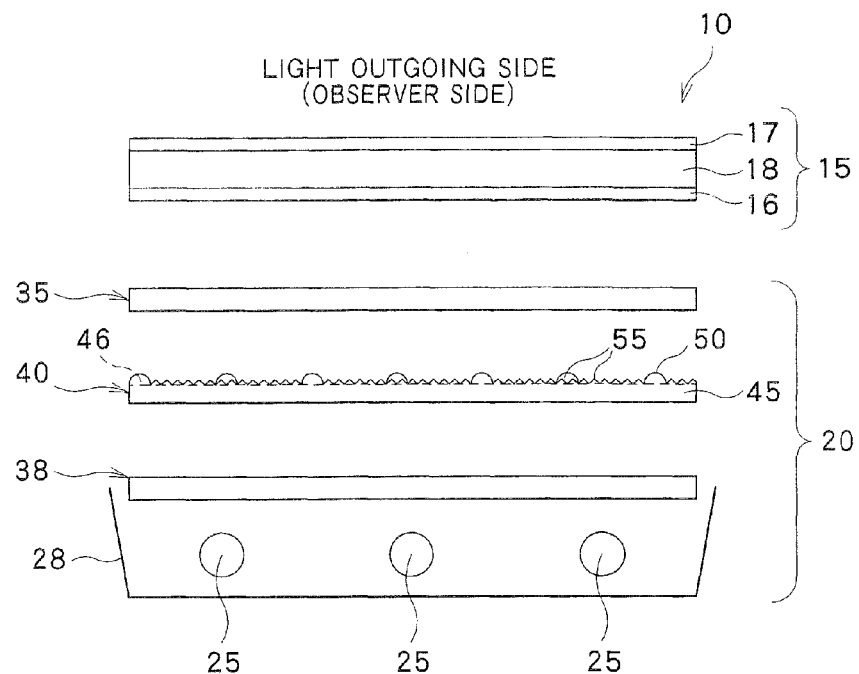
FIG. 1 is a diagram for illustrating one embodiment of the present invention, and shows a cross section schematically illustrating construction of a transmission-type display device and a surface light source device.
Figure 2:
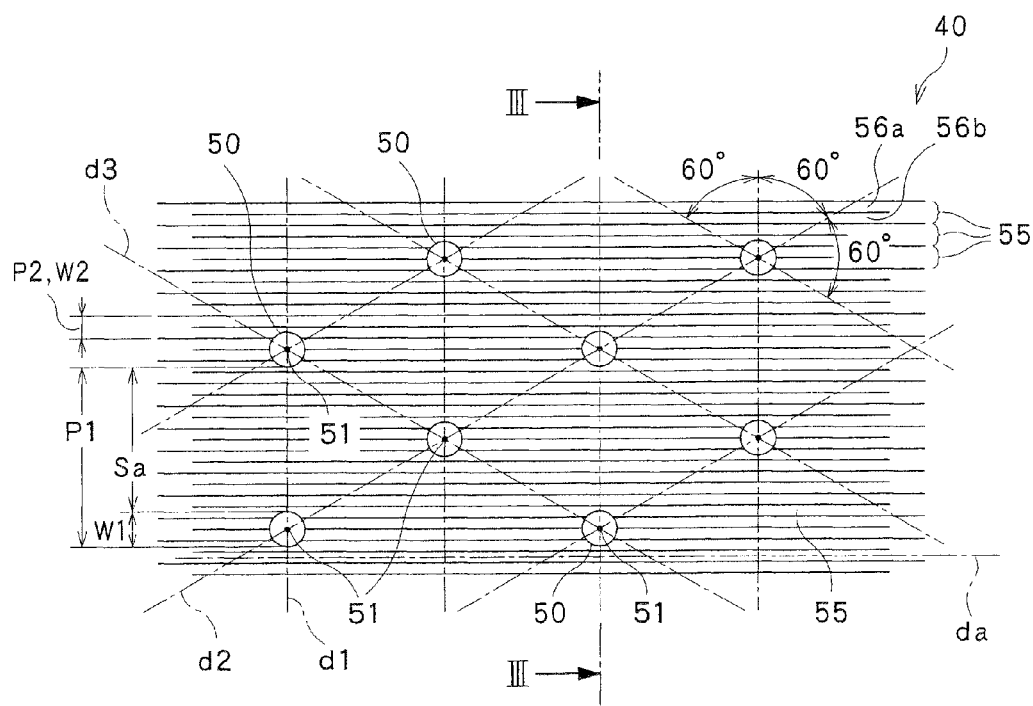
FIG. 2 is a top view of the optical sheet, which is incorporated in the surface light source device shown in FIG. 1, from a light outgoing side.
Figure 3:
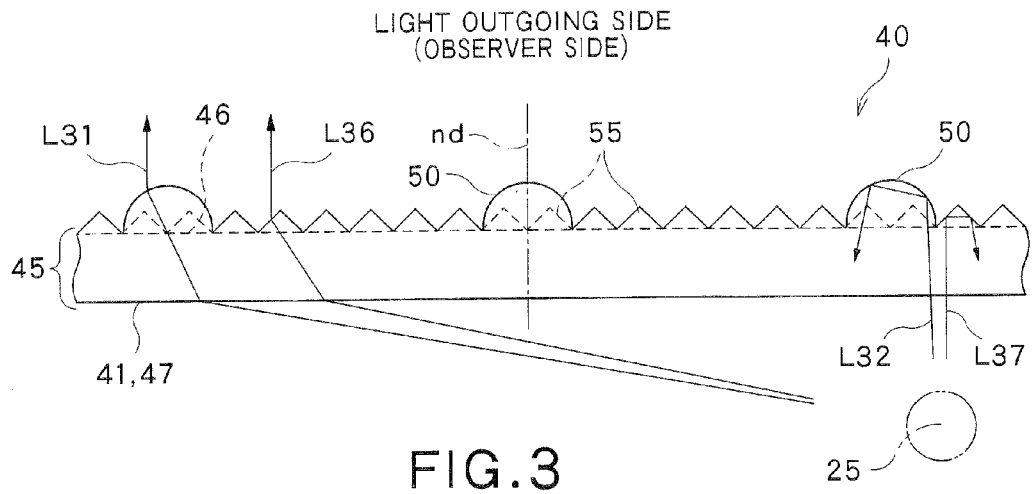
FIG. 3 is a diagram for explaining the function of the optical sheet shown in FIG. 2, and shows a cross section of the optical sheet taken along the line III-III in FIG. 2.
Figure 4:
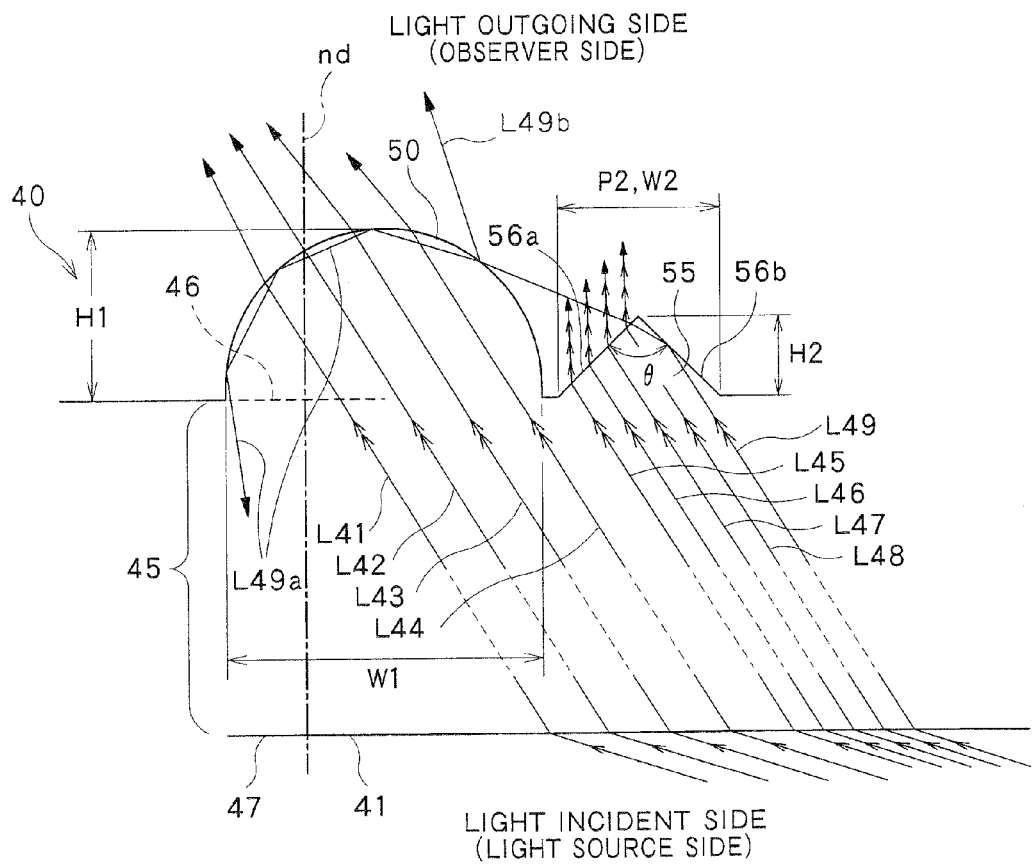
FIG. 4 is a diagram corresponding to a part of the cross section of FIG. 3 and is a diagram for explaining the function of each unit shaped element included in the optical sheet shown in FIG. 2

FIGS. 1 through 7 are provided for illustrating the embodiment of the present invention. Among these drawings, FIG. 1 is the cross section for schematically illustrating the construction of the transmission-type display device and the surface light source device, FIG. 2 is the top view of the optical sheet, and FIGS. 3 and 4 are the cross sections respectively taken along the normal direction relative to the sheet surface of the optical sheet.

The transmission-type display device 10 shown in FIG. 1 includes the transmission-type display unit 15, and the surface light source 20 located on the rear surface side of the transmission-type display unit 15 (on the opposite side of an image observer) and adapted for planarly illuminating the transmission-type display device 15 on the rear surface side of the display unit 15. For instance, the transmission-type display unit 15 is composed of a liquid crystal display panel (LCD panel). In this case, the transmission-type display device 10 serves as a liquid crystal display device. This LCD panel commonly includes a pair of substrates 16 and 17 formed of a glass plate or the like, a liquid crystal material (layer) filled between the two substrates, and electrodes, each adapted for controlling orientation of some molecules of the liquid crystal material, for each domain corresponding to one pixel or picture element, with a certain electric field. That is to say, the molecules of the liquid crystal material filled between the two substrates are designed such that the orientation and/or arrangement thereof can be optionally changed, for each domain corresponding to one pixel or picture element. As a result, the liquid crystal display unit or panel 15 can serve as a shutter adapted for creating a desired image thereon, by selectively transmitting or blocking the light emitted with uniform in-plane brightness distribution (in-plane luminance distribution) from the surface light source device 20, for each domain corresponding to each pixel or picture element.

Meanwhile, the surface light source device 20, as shown in FIG. 1, includes the surface light source 25, the optical sheet 40 adapted for deflecting the travel direction of the light emitted from the light source 25 and then transmitting such deflected light therethrough, and a polarized-light separating film 35 located on the light outgoing side of the optical sheet 40. Further, a light diffusing sheet 38 adapted for diffusing the light is provided on the light incident side (light entrance side, light inputting side) of the optical sheet 40. While the surface light source device 20 may be provided in various forms, such as an edge-light (side-light) type device or the like, the device 20 described in this embodiment is provided as a direct backlight type unit. Therefore, this light source 25 is located on the light incident side of the optical sheet 40 to be opposed to the optical sheet 40. Further, the light source 25 is surrounded by or covered with a box-like reflector 28 having an opening (or widow) opened toward the optical sheet 40.

The term "light outgoing side (light exiting side, light emerging side)" herein refers to a downstream side (observer side, the upper side in FIGS. 1, 3 and 4) in the direction of light that travels from a light source 25 toward an observer, passing through an optical sheet 40, etc., without turning back. Meanwhile, the term "light incident side (light entrance side, light inputting side)" herein refers to an upstream side (light source side) in the direction of light that travels from the light source 25 toward an observer, passing through the optical sheet 40, etc, without turning back.

Further, the terms "sheet", "film" and "plate" are not intended to discriminate one from another, based on the difference in such literal expressions. That is to say, the term "sheet" may be used herein for expressing such a part or a member that can also be referred to as "film" or "plate".

In addition, the term "sheet surface (or film surface or plate surface)" refers herein to the surface extending along a plane direction of each sheet-like part or member of interest, when taking a perspective and overall view of such a sheet-like part or member. For instance, in this embodiment, the sheet surface of the optical sheet 40, the film surface of the polarized-light separating film 35, the sheet surface of the light diffusing sheet 38, a light emitting surface of the surface light emitting device 15, and a display surface of the transmission-type display device 10 are parallel to one another. Further, the "front direction" means the direction of a normal line nd (see, FIG. 3) relative to the sheet surface of the optical sheet 40, and also corresponds to the normal direction relative to the light emitting surface of the surface light source device 20.

Further, the light source 25 may be provided in various aspects, such as fluorescent light lamps including linear cold-cathode fluorescent lamps, LEDs (Light Emitting Diodes) as point-like light source, incandescent lamps, a planar EL (Electro-luminescent Light source) and the like. In this embodiment, however, as shown in FIG. 1 and FIG. 3 (by a two-dot chain line), the light source 25 includes cold-cathode fluorescent lamps extending linearly (extending along a straight line). The reflector 28 is provided for reflecting the light emitted from the light source 25 toward the optical sheet 40. Therefore, at least an inner surface of the reflector 28 is formed of a material having relatively high reflectance, such as a metal or the like.

The polarized-light separating film 35 is provided as a sheet-like member having a function for transmitting therethrough a certain polarized component of the light incident thereon, depending on a polarized state of the incident light, while reflecting and returning the other polarized components of the incident light toward the light source. As the polarized-light separating film 35 that can serve to enhance the brightness (luminance), a "DBEF®" film available from the US-3M Corporation can be mentioned. In addition to the "DBEF" film, a high brightness polarized-light sheet "WRPS" available from the KR-Shinwha Intertek Corporation or a wire-grid polarizer can be mentioned as the polarized-light separating film 35.

The light-diffusing sheet 38 is provided as the sheet-like member that can serve to diffuse the light incident thereon, more preferably diffuse isotropically the incident light, thereby to mitigate unevenness of the brightness attributable to the construction of the light source 25, in other words, to obscure image of the light source, more specifically the unevenness of the brightness attributable to the arrangement of the light emitting tubes (i.e., the cold-cathode fluorescent lamps) constituting together the light source 25, thus uniformizing the in-plane distribution of the brightness. As the light diffusing sheet 38, a sheet including a base part and light diffusing particles appropriately dispersed in the base part can be used. As one example, the light diffusing function can be provided to the light diffusing particles, such as by forming those particles from a material having relatively high reflectance, or by forming those particles from a material having a refractive index substantially different from a refractive index of the material used for forming the base part.

Now, the optical sheet 40 will be described.

As shown in FIGS. 2 and 3, the optical sheet 40 includes a sheet-like main body 45, at least three or more first unit shaped elements (point-like unit shaped elements, first unit optical elements) 50 arranged on one surface 46 of the sheet-like main body 45 so as to constitute a fly-eye lens, and multiple second unit shaped elements (linear unit shaped elements, second unit optical elements) 55 arranged on the one surface 46 of the sheet-like main body 45 so as to extend in one direction on the sheet surface. As shown in FIG. 2, the first unit shaped elements 50 are arranged, with a proper space, on the one surface 46 of the main body 45. Meanwhile, the second unit shaped elements 55 are positioned between the first unit shaped elements 50 on the one surface 46 of the main body 45. In this embodiment, the whole area of the one surface 46 of the main body 45 is covered with the first unit shaped elements 50 and the second unit shaped elements 55. More specifically, a part of the area of the one surface 46 of the main body 45 is covered with the first unit shaped elements 50, and all the remaining area, excluding the part of the area, of the one surface 46 of the main body 45 is covered with the second unit shaped elements 55. Due to the arrangement of the first unit shaped elements 50 and the second unit shaped elements 55, a so-called "direct-through" can be prevented, i.e., the light incident on the optical sheet 40 can be prevented from going out from the light emitting surface of the optical sheet 40 without being subjected to the optical action.

In this embodiment, as shown in FIGS. 3 and 4, the main body 45 has the other surface 47 opposite to the one surface 46, wherein this surface 47 is flat and constituting a light incident side surface 41 of the optical light sheet 40. The term "flat" means "optically flat". That is to say, the light incident side surface 41 of the optical sheet 40 (i.e., the other surface 47 of the main body 45) is designed and/or configured not to diffuse but to refract visible light, at some rate, while satisfying the Snell's law. Accordingly, assuming that the so-called ten-point average roughness Rz (see JISB0601) of the other surface 47 of the main body 45 (i.e., the light incident side surface 41 of the optical sheet 40) is set to be equal to or less than the shortest visible-light wavelength (i.e., 0.38 μm), such a surface can be duly referred to as the "flat" surface herein.

Next, the first unit shaped elements 50 will be discussed. The plurality of first unit shaped elements 50 are two-dimensionally arranged on the one surface 46 of the main body 45. The plurality of first unit shaped elements 50 at least include three first unit shaped elements whose centers 51 define a triangle on the one surface 46 of the main body 45. That is to say, as shown in FIG. 2, two of the three first unit shaped elements 50 are arranged such that the centers 51 thereof are displaced along one direction on the one surface 46, and two first unit shaped elements different from the above combination are arranged such that the centers 51 thereof are displaced along the other direction crossing the one direction on the one surface 46.

As one example, in the embodiment shown in FIG. 2, the multiple first unit shaped elements 50 are regularly arranged on the one surface 46 of the main body 45. In the example shown in FIG. 2, the multiple first unit shaped elements 50 are arranged on the one surface 46 of the main body 45, such that congruent circles, each corresponding to a projection of each of the first unit shaped elements 50 onto the surface 46, can be arranged on the surface 46 of the main body 45, while being spaced away from one another, as compared with a two-dimensional close-packed structure of such circles on the same surface 46. That is to say, each of the first unit shaped elements 50 is surrounded by other six circumferentially symmetric unit shaped elements 50, with an equal interval. This structure corresponds to the arrangement that the first unit shaped elements are positioned, while being spaced away from one another, as compared with the so-called hexagonal close-packed structure in a crystal. In other words, the multiple first unit shaped elements 50 are arranged, with an equal pitch, in the two different directions on the one surface 46 of the main body 45, on the sheet surface of the main body 45, while such two different arrangement directions of the unit shaped elements 50 cross to each other, with an angle of 60° defined therebetween. That is to say, as shown in FIG. 2, the multiple first unit shaped elements 50 are arranged, with the equal pitch, in a first direction d1, on the sheet surface of the main body 45, while being also arranged, with the same pitch, in a second direction d2 and in a third direction d3, on the sheet surface of the main body 45. In this case, the first direction d1 crosses to the second direction d2, while defining the 60° angle therebetween, and the first direction d1 crosses to the third direction d3, while defining the 60° angle therebetween. Further, in other words, the multiple unit shaped elements 50 are arranged, such that three of the first unit shaped elements 50, positioned nearest to one another, can have the centers 51 positioned at the apexes of each regular triangle correspondingly defined on the one surface 46 of the main body 45.

In the example shown in FIG. 2, when observed along the normal direction nd relative to the sheet surface of the optical sheet 40, the longitudinal direction da of each light emitting tube of the light source 25 is set to be orthogonal to one (i.e., d1) of the arrangement directions of the first unit shaped elements 50.

In this embodiment, the light outgoing side surface of each first unit shaped element 50 is formed by a curved surface. Thus, as shown in FIG. 3, in a cross section parallel with the normal direction nd relative to the sheet surface of the optical sheet 40, the outer profile of the light outgoing side surface of each first unit shaped element 50 is constituted by a curved line. Particularly in this embodiment, as shown in FIG. 3, in the cross section parallel with the normal direction nd relative to the sheet surface of the optical sheet 40, each of the first unit shaped elements 50 has the shape corresponding to a part of a circle or a part of an ellipse projected toward the light outgoing side thereof. In more detail, each of the first unit shaped elements 50 is formed as a unit lens having the shape corresponding to a part of a spheroid or the shape corresponding to a part of a sphere. Further, in a cross section that is parallel with the normal direction nd relative to the sheet surface of the main body 45 as well as parallel with the arrangement direction of the second unit shaped elements 55 (this cross section will also be referred to as "main cross section"), i.e., in the cross sections shown in FIGS. 3 and 4, a width W1 of the first unit shaped element 50 along the one surface 46 of the main body 45 has a length equal to or longer than a height H1 of the first unit shaped element 50 from the one surface 46 along the normal direction nd (i.e., W1≥H1). As a result, as shown in FIGS. 3 and 4, in the main cross section of the optical sheet 40, the profile near to the vertex of the first unit shaped element 50 is largely inclined with respect to the normal direction nd.

When the cross-sectional shape of the first unit shaped element 50 having the light outgoing side surface formed by a curved surface corresponds to the part of the ellipse, either one of the major axis or minor axis of such an elliptic cross-sectional shape preferably extends in parallel with the normal direction nd (in the front direction) relative to the sheet surface of the optical sheet 40, from the view point of obtaining a brightness angular distribution that is symmetric about the front direction.

More specifically, the arrangement pitch P1 (see FIG. 2) between the first unit shaped elements 50 on the one surface 46 of the main body 45 may be set within a range of from 10 μm 400 μm. Further, the width W1 (see FIG. 2) of the bottom face of each of the first unit shaped elements 50 along the arrangement direction of the first unit shaped elements 50 on the one surface 46 of the main body 45 may be set within a range of from 10 μm to 200 μm. In addition, the height H1 (see FIG. 4) of projection of each of the first unit shaped elements 50 from the one surface 46 of the main body 45 along the normal direction nd relative to the sheet surface of the optical sheet 40 may be set within a range of from 5 μm to 100 μm. It is noted that the first unit shaped elements 50 have the same construction in the example shown in the drawings.

In this embodiment, when the optical sheet 40 is observed from the side on which the unit shaped elements 50 and 55 are arranged along the normal direction nd of the optical sheet 40, the first unit shaped elements 50 are arranged on the one surface 46 of the main body 45 such that a rate of the area occupied by the first unit shaped elements 50 on the one surface 46 (this rate will also be referred to as "filling rate") is not more than 10.0%. In other words, the filling rate corresponds to an area ratio of an area obtained by projecting a part of the light outgoing side surface of the first unit shaped elements 50, which is not covered with the second unit shaped elements 55, onto the one surface 46 along the normal direction nd of the optical sheet 40, with respect to the one surface 46.

The arrangement pitch P1, the width W1 and the height H1 and the like of the first unit shaped elements 50 are set so as to satisfy the condition of the filling rate. When the filling rate is actually specified, it is possible to calculate the filling rate of one section on the light outgoing side surface of the optical sheet 40 observed by, e.g., a microscope, the one section having a surface area that can be expected to reflect the overall filling rate in consideration of the arrangement pitch P1 and the width W1 and so on of the first unit shaped elements 50 (for example, in an optical sheet including the first unit shaped elements having the dimensions as described above, a part of 10 mm×10 mm), and to handle the calculated value as the filling rate of the optical sheet.

Next, the second unit shaped elements 55 will be described. The multiple second unit shaped elements 55 constitute together a linear-array prism unit. In this embodiment, as shown in FIG. 2, each of the second unit shaped elements 55 linearly extends in one direction parallel with the sheet surface of the main body 45. In addition, the multiple second unit shaped elements 55 are arranged in the other direction orthogonal to the direction in which the second unit shaped elements extends (the one direction) without any space or interval. In the example shown in the drawings, when observed along the normal direction nd relative to the sheet surface of the optical sheet 40, each of the second unit shaped elements 55 extends orthogonally to the one (d1) of the arrangement directions of the first unit shaped elements 50 and in parallel with the longitudinal direction da of each light emitting tube of the light source 25.

In this embodiment, as shown in FIGS. 3 and 4, in the main cross section (cross section that is parallel with the arrangement direction of the second unit shaped elements 55 as well as parallel with the normal direction nd of the sheet surface of the optical sheet 40), each of the second unit shaped elements 55 has a polygonal shape, in particular, a triangular shape projected toward the light outgoing side. That is to say, each of the second unit shaped elements 55 is provided as the unit prism of a triangle column. In particular, from the viewpoint of intensively enhancing the front brightness (front luminance), it is preferred that each of the second unit shaped elements 55 has a cross-sectional shape of an isosceles triangle, with the vertex angle between the equal sides of this isosceles triangle projected toward the light outgoing side from the one surface 46 of the main body 45.

In the example shown in the drawings, a width W2 (see FIG. 4) of the bottom face of each of the second unit shaped elements 55 along the arrangement direction of the second unit shaped elements 55 on the one surface 46 of the main body 45 is smaller than the width W1 of each of the first unit shaped elements 50 along the arrangement direction of the second unit shaped elements 55 on the one surface 46 of the main body 45. More specifically, the width W2 (see FIG. 4) of the bottom face of each of the second unit shaped elements 55 along the arrangement direction of the second unit shaped elements 55 on the one surface 46 of the main body 45 may be set within a range of from 1 μm to 200 μm. Further, a height H2 (see FIG. 4) of projection of each of the second unit shaped elements 55 from the one surface 46 of the main body 45 along the normal direction nd relative to the sheet surface of the optical sheet 40 may be set within a range of from 0.5 μm to 50 μm. Again, it is noted that the second unit shaped elements 55 have the same construction in the example shown in the drawings. Furthermore, in the case in which the cross-sectional shape of each of the second unit shaped elements 55 is the isosceles triangle shape, the angle θ (see FIG. 4) of the vertex angle between the equal sides of this isosceles triangle projected toward the light outgoing side is preferably set within a range of from 80° to 120°, or preferably 90°, from the viewpoint of intensively enhancing the front brightness (front luminance).

It is noted that the term "triangular shape" or "triangle shape" is intended herein not only to mean a triangular shape in the strict sense of the words, but also to mean a substantially triangular shape involving a limit (bound) of precision of a manufacturing technique, an error associated with a molding process and the like, as well as substantially triangular shape that can be expected to exhibit optical functions similar or equivalent to those obtained by the genuine triangle shape. That is to say, a triangular shape including a rounded apex portion, a triangular shape with a head portion cut off (i.e., truncated triangular shape) and the like may also be included in the "triangular shape". Similarly, each of such terms, for example, "circle", "ellipse", "parallel", "orthogonal", "polygonal shape" and the like, as used herein for expressing various specific shapes and or conditions, is intended not only to include the geometrical shape and/or condition in the strict sense of the term, but also to include any similar geometrical shape and/or condition including geometrical shapes and/or conditions that can be expected to exhibit the optical functions substantially similar or equivalent to those obtained from one expressed by the true sense of the term.

According to the above structure, the shape (bottom shape) of each of the first unit shaped elements 50, which is projected on a face in parallel with the one surface 46 of the main body 45, is not a linearly extended columnar body like the second unit shaped element, but a polygonal shape and a shape formed by bounded closed curve which are typified by a circle, an ellipse, a triangular shape, a rectangular shape, a hexagonal shape or the like, and the extension of which in the face is limited. Since the first unit shaped elements 50 of such a geometric shape are arranged on the one surface 46 of the main body 45 at the filling rate of not more than 10%, the first unit shaped elements 50 are arranged on the one surface 46 such that the respective unit lenses (unit shaped elements) are spaced apart from one another with a wider interval therebetween, as compared with an interval in a fly-eye lens. Each of the second unit shaped elements 55 occupies (is located in) such an interval. Each of the second unit shaped elements 55 is continuously extended on the one surface 46 of the main body 45 from the one end toward the other end, but is divided into sections by the first unit shaped elements 50 in contact with the second unit shaped element 55.

As shown in FIGS. 3 and 4, the height H2 of the projection of each of the second unit shaped elements 55 from the one surface 46 of the main body 45 along the normal direction nd relative to the sheet surface of the optical sheet 40 is lower than the height H1 of the projection of each of the first unit shaped elements 50 from the one surface 46 of the main body 45 along the normal direction nd relative to the sheet surface of the optical sheet 40. As a result, on the one surface 46 of the main body 45, the second unit shaped elements 55 are divided into sections by the first unit shaped elements 50, while each divided section of the second unit shaped element 55 extends between two first unit shaped elements 50 located adjacent to each other along the longitudinal direction of the divided second unit shaped element 55.

As described in the column about the background art, in general, before being incorporated into a transmission-type display device, an optical sheet is handled, e.g., transported as a member in the form of multiple overlapped sheets of a size suitable for being incorporated into the transmission-type display device, or as a member in the form of a wound web-like sheet that is not yet cut into a size suitable for being incorporated into the transmission-type display device. In addition, the optical sheet is overlapped with another member, and is incorporated into a surface light source device (transmission display device). Then, the surface light source device (transmission display device) including the optical sheet and the other member is handled, e.g., transported. At this time, each of unit shaped elements (unit prisms) like the second unit shaped element 55 having a triangular cross section in a main cross section with a pointed end is likely to locally come into contact with the other member at a small area. For this reason, the optical sheet might have a defect that is visible to an observer when the optical sheet is incorporated in a display device, such as formation of scratches on the vertex of the unit shaped element and further deformation of the vertex of the unit shaped element.

On the other hand, in this embodiment, the height H2 of the second unit shaped element 55 from the main body 45 is lower than the height H1 of the first unit shaped element 50, which has a cross-sectional shape corresponding to a part of a circular shape or an elliptic shape, from the main body 45. As a result, even when the optical sheet 40 is arranged in adjacent to another member and the first unit shaped elements 50 are in contact with the other member, each of the second unit shaped elements 55 having the sharp vertex susceptible to an external force can be prevented from being in contact with the other member.

Since each of the first unit shaped elements 50 has a cross-sectional shape corresponding to a part of a circular shape or an elliptic shape, the first unit shaped elements 50 has a higher rigidity at the vertex thereof, as compared with the second unit shaped element 55 of a triangular cross-sectional shape. In addition, the portion near to the vertex of the first unit shaped element 50 has a spherical surface or a surface approximate to the spherical surface. Thus, another member in contact with the first unit shaped element geometrically tends to slip thereon, whereby friction caused when the first unit shaped element 50 comes into contact with the other member can be reduced. In the first place, when each of the first unit shaped elements 50 is provided as a part of a sphere or a part of a spheroid, even when at least one of the optical sheet 40 and the other member adjacent thereto is bent or warped, the relative positions of the optical sheet 40 and the other member can be smoothly changed. Namely, the friction force between the optical sheet 40 and the other member can be reduced. Further, as compared with the case in which the second unit shaped element 55 having a triangular cross section is in contact with the other member, it can be expected that, when the first unit shaped element 50 comes into contact with the other member, a contact area thereof with the other member is larger, which reduces a contact pressure per unit area. For these reasons, it can be said that, as compared with the second unit shaped element 55, the first unit shaped element 50 has an excellent scratch resistance, whereby the vertex of the unit shaped element can be prevented from being scratched, crushed or otherwise deformed.

In particular, in this embodiment, the width W1 of the first unit shaped element 50 has a length that is equal to or larger than the height H1 thereof. Thus, the first unit shaped element 50 can have a more flattened profile at the vertex thereof, and thus have a more excellent scratch resistance.

For the foregoing structures, according to the present invention, there can be prevented inconveniences attributable to the contact of the unit shaped elements of the optical sheet 40 with another member, such as lowering of throughput of the optical sheet 40 and/or deterioration of image quality displayed by the display device 10 in which the optical sheet 40 is incorporated.

From the viewpoint of enhancing the scratch resistance of the optical sheet 40, the height H2 of projection of each of the second unit shaped elements 55 is preferably set within a range of from $\frac{1}{10}$ to $\frac{9}{10}$ of the height H1 of the projection of each of the first unit shaped element 50, and is more preferably set not more than $\frac{2}{3}$ of the height H1 of the projection of each of the first unit shaped element 50.

The enhancement of the scratch resistance as described above can be assured when three or more first unit shaped elements 50 are arranged on the main body 45. This is because only one surface that is not in contact with the second unit shaped element 55 is geometrically defined by the vertexes 51 of the three first unit shaped elements 50, and the surface of another member located adjacently to the optical sheet can be positioned and supported on the position of the one surface. Note that, from the extensive studies on the filling rate conducted by the inventors, it was found that, in the optical sheet incorporated and used in a display device, when the filling rate of the first unit shaped elements 50 is 0.1% or more, the scratch resistance of the optical sheet 40 can be stably enhanced by keeping the second unit shaped elements 55 away from another member adjacent thereto. When the filling rate of the first unit shaped elements 50 is 0.3% or more, the scratch resistance of the of the optical sheet 40 can be furthermore stably enhanced by keeping the second unit shaped elements 55 away from another member adjacent thereto.

Figure 5:
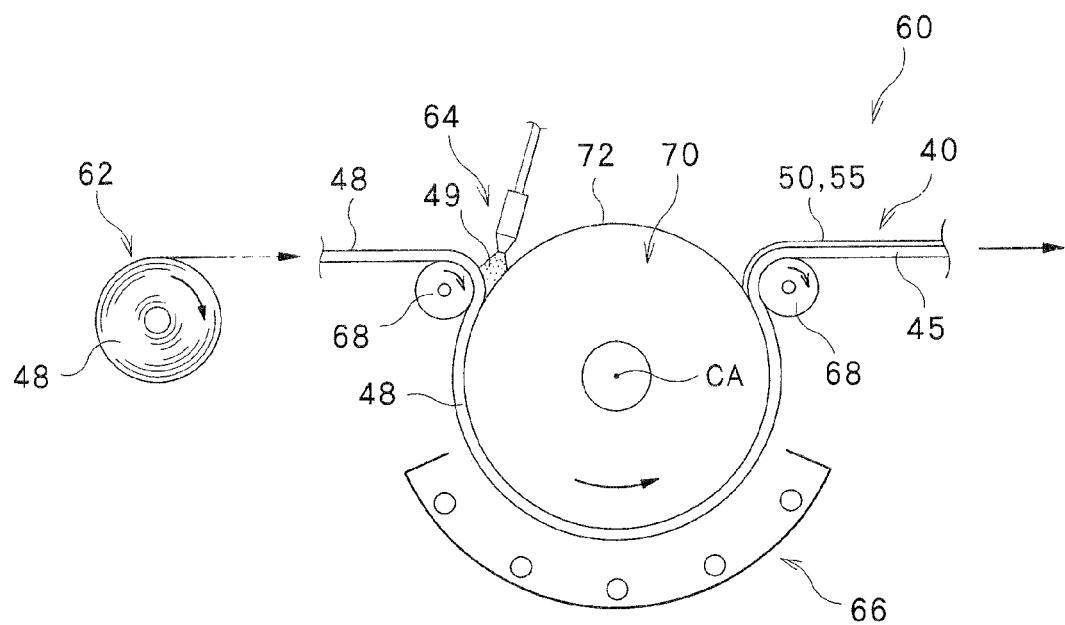
FIG. 5 is a diagram for schematically explaining the method for producing the optical sheet and a molding apparatus used for molding the optical sheet.

Next, one example of the method for producing the optical sheet 40 constructed as described above will be discussed. In the example below, the first unit shaped elements 50 and the second unit shaped elements 55 can be integrally formed on a sheet material 48 by a molding method using a molding machine 60 as shown in FIG. 5. As the material used for forming the first unit shaped elements 50 and the second unit shaped elements 55, there can be used any suitable resin that is readily available and has excellent moldability as well as adequate transparency (for example, a clear cross-linked curing material formed from a composition comprising a multifunctional urethane acrylate oligomer and a dipentaerythritol hexaacrylate monomer and having a refractive index of 1.57).

Figure 6:
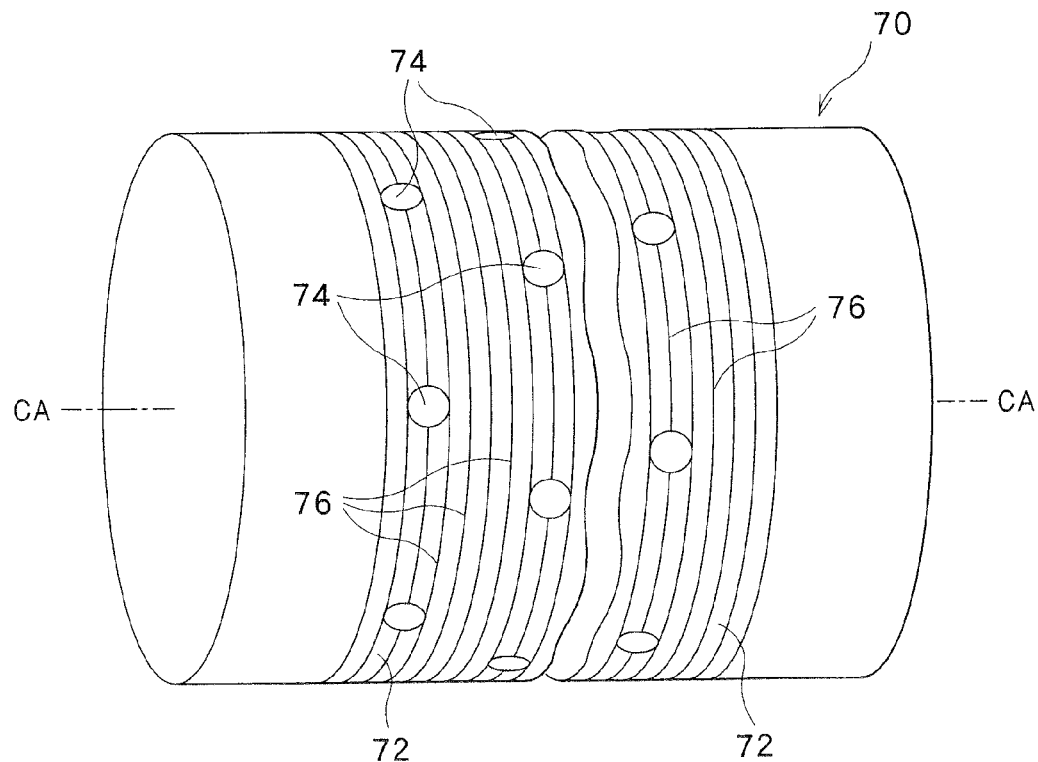
FIG. 6 is a perspective view schematically showing the mold incorporated in the molding apparatus shown in FIG. 5.

First, the molding machine 60 will be described. As shown in FIG. 5, the molding machine 60 includes a mold 70 having a substantially cylindrical contour. As shown in FIG. 6, a cylindrical outer circumferential face (or side face) of this mold 70 includes a cylindrical molding surface (or concavoconvex surface) 72. Further, this cylindrical mold 70 has a central axis CA extending through the center of the cylindrical outer circumferential face thereof. That is to say, this central axis CA extends through the center of a cross section of the cylindrical body of the mold 70. The mold 70 can serve as a roll-type mold adapted for molding the optical sheet 40, as an article to be molded, while rotating about the central axis CA thereof (see FIG. 5).

As shown in FIG. 6, in the molding surface 72, concave or recessed portions 74, corresponding to the first unit shaped elements 50 of the optical sheet 40, and grooves 76, corresponding to the second unit shaped elements 55, are formed. Each groove 76 extends along the outer circumferential face of the mold 70, circularly or spirally, about the central axis CA of the molding surface 72. In either case, each groove 76 extends in a substantially vertical direction relative to the central axis CA of the molding surface 72 (e.g., the angle at which the groove 76 extends relative to the central axis is approximately $90°±1×10^{-2°}$). Each recessed portion 74 can be formed, such as by etching utilizing photolithography, in a desired position of a circumferential face of a cylindrical base material formed by coating a surface of a hollow iron core with a copper layer. Then, in the circumferential face of the cylindrical base material, in which the recessed portions 74 have been formed, each groove 76 is formed, such as by cutting using a cutting byte, into a form crossing each recessed portion 74.

As shown in FIG. 5, the molding machine 60 further includes a molding base-material supply unit 62 adapted for supplying a belt-like sheet material (or molding base-material sheet) 48, a material supply unit 64 adapted for supplying a material 49 having proper fluidity into a space between the sheet material 48 supplied from the molding base-material supply unit 62 and the molding surface 72 of the mold 70, and a curing unit 66 adapted for curing the material 49 fed between the sheet material 48 and the concavo-convex surface 72 of the mold 70. It is noted that the curing unit 66 may be optionally configured, depending on the curing properties of the material 49 to be cured.

Now, the method for producing the optical sheet 40 by using such a molding machine 60 as described above will be discussed. First, the sheet material 48 formed from, for example, a resin having proper transparency, is supplied from the molding base-material supply unit 62. Subsequently, as shown in FIG. 5, the sheet material 48 supplied from the molding base-material supply unit 62 is fed into the mold 70 and then held by the mold 70 and a pair of rollers 68 such that the sheet material 48 is kept in as state opposite to the concavo-convex surface 72 of the mold 70.

During the supply of the sheet material 48 into the mold 70, as shown in FIG. 5, the material 49 having the proper fluidity is supplied from the material supply unit 64 to the space between the sheet material 48 and the molding surface 72 of the mold 70. As used herein, the term "having the fluidity" means that the material 49 supplied to the molding surface 72 of the mold 70 has such proper fluidity that can allow the material 49 to adequately flow into the recessed portions 74 and the grooves 76 formed in the molding surface 72. As the material 49 to be supplied, various known material suitable for this molding method can be mentioned. However, in the examples described below, an ionizing-radiation-curing resin is supplied from the material supply unit 64. As the ionizing-radiation-curing resin, for example, a UV-curing resin that can be curd when irradiated with ultraviolet (UV) rays, an EB-curing resin that can be cured when irradiated with an electron beam (or beams) (EB), and the like can be mentioned.

When a fly-eye lens in which unit lenses are two-dimensionally arranged is manufactured by a conventional mold, inconveniences, such as the incorporation of air bubbles in the unit lens or the formation of recessed defects or holes in the surface of the unit lens, are likely to occur, regardless of the filling rate of the unit lenses. Namely, even if the filling rate is low as in the case of the first unit shaped elements 50 in this embodiment, such inconveniences are likely to occur. Thus, it was expected that the first unit shaped elements 50 of the optical sheet 40 in this embodiment had air bubbles and/or recessed defects. However, from the experiments conducted by the inventors, it was found that occurrence of such inconveniences could be effectively avoided. Although the mechanism that can effectively prevent the formation of such air bubbles and/or recessed defects in the first unit shaped elements 50, which are two-dimensionally arranged similarly to unit lenses of a fly-eye lens, is still being elucidated, one mechanism that can be thought as one of the main factors of this effect can be discussed below.

Figure 7:
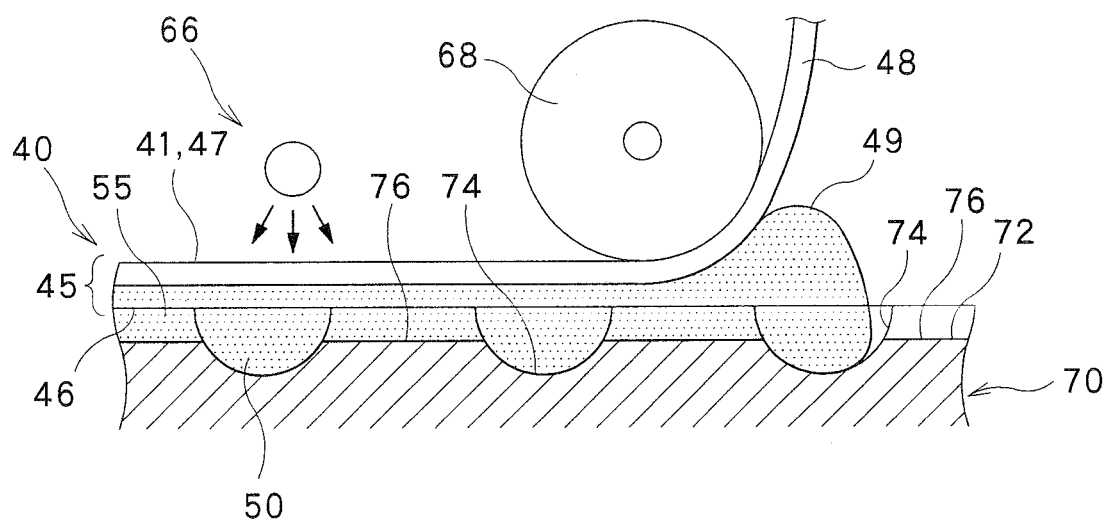
FIG. 7 is a cross section for illustrating a method for molding the optical sheet.

In the aforementioned manufacturing method, each groove 76 formed in the molding surface 72 extends along the molding surface 72 in the substantially vertical direction relative to the central axis CA of the mold 60. Thus, as shown in FIG. 7, the material 49 supplied from the material supply unit 64 can be filled over the mold 70, while being flowed along a direction corresponding to the longitudinal direction (i.e., the one direction corresponding to a lateral direction in the sheet of FIG. 7) of each of the second unit shaped elements 55 of the optical sheet 40 that will be formed by the mold 70. That is to say, the material 49 is supplied along each groove 76 provided for forming each of the second unit shaped elements 55.

As described above, each groove 76 extends along the molding surface 72, while passing through some corresponding recessed portions 74 provided for forming the first unit shaped elements 50. Therefore, when the material 49 is flowed into each recessed portion 74 of the mold 70, a gas (typically air) that has been so far present in the recessed portion 74 will be readily pushed out from the recessed portion 74 into the groove 76, with the supply of the material 49. That is to say, such a gas or air will tend to be pushed out and removed away from the inside of the each recessed portion 74 of the mold 70, via a certain path, with the supply and filling of the material 49 into the recessed portion 74. Thus, it can be expected that the aforementioned molding method can effectively prevent the air bubbles from being incorporated or taken in the material 49 filled in the molding surface 72. However, it is important to note that this invention is not limited to the mechanism as assumed above.

From the further experiments conducted by the inventors, it was found that it is effective for enhancing the effect of removing or discharging the gas from the inside of the mold 70 to set the height H2 of the projection of each of the second unit shaped elements 55, at the ratio of 1/10 or higher, more preferably at the ratio of 1/3 or higher, as compared with the height H1 of the projection of each of the first unit shaped elements 50.

Thereafter, the molding sheet material 48 is passed through a position opposite to the curing unit 66, with the space between the sheet material 48 and the molding surface 72 of the mold 70 filled with the ionizing-radiation-curing resin. At this time, ionizing radiation (ultraviolet ray, electron beam or the like) suitable for the curing properties of the ionizing-radiation-curing resin 49 is radiated from the curing unit 66. As such, the ionizing-radiation-cuing resin 49 can be irradiated with the ionizing radiation transmitted through the sheet material 48. As a result, the ionizing-radiation-curing resin 49 filled in the recessed portions 74 and grooves 76 of the molding surface 72 can be cured. In this way, the first unit shaped elements 50 and the second unit shaped elements 55 can be formed on the sheet material 48, from the so-cured ionizing-radiation-curing resin 49.

Thereafter, as shown in FIG. 5, the sheet material 48 is released or separated from the mold 70, while the unit shaped elements 50, 55, respectively molded in the recessed portions 74 and the grooves 76 of the molding surface 72, are pulled away from the mold 70, together with the sheet material 48. In this way, the above-described optical sheet 40 can be obtained.

During the unmolding (separation) of the molded unit shaped elements 50, 55 (or cured material 49) from the mold 70, the unit shaped elements 50, 55 (or cured material 49) are gradually pulled away from the mold 70, along the longitudinal direction (i.e., the one direction) of each of the molded second unit shaped elements 55. As described above, each of the second unit shaped elements 55 is molded integrally with some corresponding first unit shaped elements 50 and extends in its longitudinal direction. Accordingly, this method can allow the molded second unit shaped elements 55 and the molded first unit shaped elements 50 to be smoothly unmolded (separated or released) from the mold, thereby successfully avoiding unwanted occurrence of cracks in the molded second unit shaped elements 55 and the molded first unit shaped elements 50, as well as effectively preventing such molded second unit shaped elements 55 and the molded first unit shaped elements 50 from being peeled off from the sheet material 48.

In the example shown in FIG. 7, the sheet material is not directly in contact with the surface of the mold 70. Therefore, the main body 45 of the optical sheet 40 formed as shown in FIG. 7 will be composed of the sheet material 48 and the material 49 cured into a sheet-like form. Therefore, this method can successfully prevent the molded second unit shaped elements 55 and the molded first unit shaped elements 50 from being partly left in the mold upon the unmolding (release or separation) of these elements from the mold.

As described above, during the one rotation of the roll-type mold 70 about the central axis CA, the step of supplying the fluidic material 49 into the mold 70, the step of curing the material supplied in the mold 70 in this mold 70, and the step of unmolding (releasing) the cured material 49 from the mold 70 are successively performed on the molding surface 72 of the mold 70, thus forming the optical sheet 40. At this time, by molding such an optical sheet 40 such that the longitudinal direction (the one direction) of each of the second unit shaped elements 55 is oriented along the machine direction, the incorporation of the unwanted air bubbles in the optical sheet 40 and/or the formation of the unnecessary holes in the surface of the optical sheet 40 can be successfully controlled. Therefore, the obtained optical sheet 40 can adequately exhibit excellent optical properties as desired. Further, because the effect of removing or discharging the air bubbles from the inside of the mold 70 is positively enhanced, the optical sheet 40 including the two-dimensionally arranged first unit shaped elements 50 can be produced more rapidly with higher efficiency, as compared with a usual fly-eye lens sheet. This can save the cost for producing an optical sheet 40 including the first unit shaped elements 50. It is noted that the cost for preparing the mold used for molding the optical sheet 40 is not so increased, as compared with the cost for preparing a mold for molding a conventional prism sheet including a unit prism having a triangular cross section and a mold for molding a usual fly-eye lens sheet.

The above molding method for manufacturing the optical sheet 40 is nothing more than a mere example, and the optical sheet 40 may be manufactured by any other suitable method such as an extrusion method, a transfer molding method or the like.

Next, the operation of each of the optical sheet 40, the surface light source device 20 and the transmission-type display device 10, as described above, will be discussed.

First of all, the general operation or function of the transmission-type display device 10 and the surface light source device 20 will be described.

As shown in FIG. 1, the light emitted from the light source 25 travels toward the observer, directly, or otherwise after reflected by the reflector 28. Thereafter, the light is isotropically diffused by the light diffusing sheet 38, and then incident on the optical sheet 40. In the optical sheet 40, the light is deflected, such that the angle formed between the travel direction of the light and the front direction (i.e., the normal direction relative to sheet surface of the optical sheet 40) nd will be lessened so as to approach substantially 0°. Additionally, in the optical sheet 40, the light is diffused such that the in-plane distribution of the brightness can be uniformed. The operation or function of the optical sheet 40 will be detailed later.

Thereafter, the light outgoing from the optical sheet 40 is transmitted through the polarized-light separating film 35. The transmission-type display unit 15 can transmit therethrough the light incident thereon from the surface light source device 20, selectively, for each pixel or picture element. In this way, the observer can observe each image displayed on the transmission-type display device 10.

Next, the operation or function of the optical sheet 40 will be described in more detail.

First of all, the operation or function of the second unit shaped elements (unit prisms) 55 constituting together a large part of the light outgoing side surface of the optical sheet 40 is described. As shown in FIGS. 3 and 4, the light L36 and L45 to L48 each outgoing from the optical sheet 40, via the second unit shaped element 55 forming a linear-array prism unit, is refracted at a surface 56a of a light outgoing side surface (prism surface) of the second unit shaped element (unit prism) 55. With this refraction, the travel direction of each light L36 and L45 to L48 that has traveled obliquely relative to the front direction nd is changed, such that the angle of the travel direction relative to the normal direction nd to the sheet surface of the optical sheet 40 can be substantially lessened, as compared with the travel direction of the light before or upon being incident on the optical sheet 40. With this operation or function, as described above, each of the second unit shaped elements 55 can serve to change the travel direction of the light transmitted therethrough toward the front direction nd. That is to say, each of the second unit shaped elements 55 can have a light collecting (condensing) effect on the light transmitted therethrough.

Meanwhile, as shown in FIG. 3, the light L37 traveling in a direction that is not so oblique to the front direction nd tends to undergo the repeated total reflection at the light outgoing side surface (prism surface) of each of the second shaped unit elements 55 of interest. Thus, the travel direction of such light will be eventually changed toward the light incident side (light source side).

As described above, in this embodiment, each of the second unit shaped elements 55 is arranged in parallel with the arrangement direction of each light emitting unit or tube of the light source 25. Thus, the light, which is incident on a region including a position, as a center of the region, opposite to the intermediate point of any given two adjacent light emitting units of the light source 25, where the light from the light source 25 tends to be incident at relatively large incident angle, is refracted on the light outgoing side surface (prism surface) of each of the second unit shaped elements 55 such that the angle formed between the travel direction of the refracted light and the front direction nd will be lessened so as to approach substantially 0°. This can successfully prevent the brightness from being unduly degraded, even in the region of the optical sheet 40 including the position, as a center of the region, opposite to the intermediate point of any given two adjacent light emitting units of the light source 25, where the brightness tends to be decreased.

Meanwhile, the light, which is incident on another region located in the position just above the light source 25 of the optical sheet 40 at a small incident angle, can be returned to the light source side, due to the total reflection provided to the light at the light outgoing side surface (prism surface) of the second unit shaped element 55 (see the light L37 in FIG. 3). This operation can successfully prevent the brightness from being unduly increased in the region of the optical sheet 40 located just above each light emitting unit or tube of the light source 25, where the brightness tends to be unduly increased.

Therefore, the second unit shaped elements 55 can not only enhance the front brightness, but also serve to effectively mitigate the unevenness of the brightness (tube unevenness) attributable to the arrangement of the light emitting units (or tubes) of the light source 25, thereby to render the image of the light source (light image) substantially inconspicuous.

Next, the operation or function of the first unit shaped elements (unit lenses) 50 is described. As shown in FIGS. 3 and 4, each of the first shaped elements 50 has mainly a light collecting (condensing) effect on the light L31 and L41 to L44 each travels largely obliquely relative to the normal direction nd. Meanwhile, as shown in FIG. 3, each of the first unit shaped element 50 functions to return the light L32, which travels in a direction not so oblique to the normal direction nd, toward the light incident side, due to the total reflection provided to the light L32. That is to say, the first unit shaped element 50 has a function for enhancing the front brightness while uniformizing the in-plane distribution of the brightness, which is substantially similar to the second unit shaped element 55.

As described above, each of the first shaped element 50 is symmetric about the normal direction nd at least the vertex thereof. In addition, the first unit shaped elements 50 are arranged two-dimensionally on one surface 46 of the main body 45. Thus, each of the first unit shaped elements 50 can change the travel direction of the light, in the plane extending in any given direction on the sheet surface of the optical sheet 40. Therefore, even though the optical sheet 40 is located on the light source 25, without any consideration on the arrangement direction of the light emitting units of the light source 25, an adequate light collecting (condensing) function as well as a desired light diffusing function can be exhibited by the first unit shaped elements 50.

By the way, in the case in which the light travels obliquely relative to the normal direction nd and toward each of the second unit shaped elements 55 having the polygonal cross-sectional shape, e.g., the triangular cross-sectional shape as shown in FIG. 4, such light is often incident on one light outgoing side surface (one prism surface) 56a extending in a direction reverse to the travel direction of such light, e.g., L45 to L48, with respect to the front direction nd. In this case, if the inclined angle of the traveling direction of each light L45 to L48 incident on one second unit shaped element 55 having the triangular cross-sectional shape, relative to the front direction nd, is constant, the inclined angle of the traveling direction of each light L45 to L48 outgoing from the second unit shaped element 55, relative to the front direction nd, will also be constant, irrespectively of the incident point of the light L45 to L48 on the light outgoing side surface (one prism surface) 56a. That is to say, the travel direction of each light outgoing from the second unit shaped elements 55 is determined, generally depending on the structure (e.g., shape, refractive index and the like) of each of the second unit shaped elements 55.

It is noted that the inclined angle of the travel direction of each light L41 to L49 shown in FIG. 4, relative to the front direction nd, is depicted to be substantially the same.

However, unlike such optical properties of the second unit shaped elements 55, in the case of the first unit shaped elements 50, each having the circular or elliptic cross-sectional shape, as shown in FIG. 4, even if the inclined angle of the traveling direction of each light L41 to L44 traveling toward each of the first unit shaped elements 50, relative to the front direction nd, is constant, the inclined angle of the traveling direction of such light L41 to L44 outgoing from the first unit shaped element 50, relative to the front direction nd, will vary depending on the incident point of each light L41 to L44, on the light outgoing side surface (lens surface) of the first unit shaped element 50. Accordingly, the travel direction of each light outgoing from the first unit shaped elements 50 is greatly susceptible not only to the structure (e.g., shape, refractive index and the like) of each of the first unit shaped elements 50 but also to the incident point of the light on the first unit shaped element 50.

As shown in the drawings, the pitch or interval in the arrangement of the first unit shaped elements 50 and the second unit shaped elements 55 is quite narrow, as compared with the interval in the arrangement of the light emitting units or tubes of the light source 25. Accordingly, the traveling angle of the light which is emitted from the light source 25 and travels toward one unit shaped element 50 or 55 is substantially the same. Thus, each of the first unit shaped elements (unit lenses) 50 having the light outgoing side surface formed by a curved surface can serve to collect (condense) the angle of the light travel direction relative to the front direction nd into a relatively wide angular range as well as to smoothly change the brightness distribution over the angular range into which this element 50 collects the light travel direction. On the other hand, each of the second unit shaped elements (unit prisms) 55 having the polygonal cross-sectional shape can serve to collect (condense) the angle of the light travel direction relative to the front direction nd into a relatively narrow angular range centered on the front direction nd. That is to say, by suitably designing the structure of the second unit shaped element 55 having the polygonal cross-sectional shape, the second unit shaped element 55 can exhibit a highly excellent light collecting function.

That is to say, each of the second unit shaped elements (unit prisms) 55 having the polygonal cross-sectional shape can exhibit a stronger light condensing function, as compared with each of the first unit shaped elements (units lenses) 50 having the light outgoing side surface formed by the curved surface, while the first unit shaped element (unit lens) 50 can exhibit a stronger light diffusing function, as compared with the second unit shaped element (unit prism) 55. In view of the optical properties of the first unit shaped elements 50 and the second unit shaped elements 55, the optical sheet 40 in this embodiment having both the first unit shaped elements 50 and the second unit shaped elements 55 is expected to have a lower front brightness, as compared with a conventional prism sheet having only the second shaped unit elements 55.

In the optical sheet disclosed in JP2008-70456A, because of the structure in which a part of the unit spherical lens is located on the inclined surface of the unit prism having a triangle columnar shape, the unit prism and the unit spherical surface lens restrain their functions each other. Thus, both of the light collecting function and the light diffusing function of the optical sheet are inferior to those of an optical sheet in which only the unit prisms are arranged and to those of an optical sheet in which only the unit spherical lenses are arranged.

On the other hand, in the optical sheet of the present invention, from the experiments (including simulations) conducted by the inventors, it was true that, as the filling rate of the first unit shaped elements 50 increased, there was a general tendency that the front brightness gradually lowered. However, it was confirmed that an area of a lower filling rate had a tendency different from the general tendency. To be specific, as shown by a part of experimental results of several examples as will be described later, it was found that by arranging the first unit shaped elements 55 and the second unit shaped elements 55 such that the first unit shaped elements 55 were sparsely arranged at a low filling rate, the front brightness substantially equivalent to that of the conventional prism sheet having only the second unit shaped elements 55 could be obtained. Further, it was found that when the first unit shaped elements 50 and the second unit shaped elements 55 were arranged such that the first unit shaped elements 50 were arranged at a filling rate of greater than 0 and not more than 10%, the front brightness could be not only maintained but also further increased, as compared with the conventional prism sheet having only the second unit shaped elements 55. This result is surprising which cannot be foreseen from the conventional technical knowledge.

The mechanism in which the first unit shaped elements 50 arranged at a low filing rate can further enhance a front brightness, in comparison with the front brightness acquired by only the second unit shaped elements 55, is not elucidated. However, some combined effect of the first unit shaped elements 50 and the second unit shaped elements 55, which can be thought as one of the factors of the mechanism, will be discussed below. However, note that this invention is not limited to the mechanism as assumed below.

In the case in which the light travels obliquely relative to the front direction nd toward each of the second unit shaped elements 55 having the polygonal cross-sectional shape, e.g., the triangular cross-sectional shape as shown in FIG. 4, most of such light is incident on the one light outgoing side surface (one prism surface) 56a extending in the direction reverse to the travel direction of such light, e.g., L45 to L48 (in the illustrated example, the surface disposed on the left side of the sheet surface and inclined rightward of the sheet surface toward the light outgoing side), with respect to the front direction nd. However, as shown in FIG. 4, a part of the light, e.g., L49, traveling toward the second unit shaped element 55 is sometimes incident on the other light outgoing side surface (the other prism surface) 56b extending in substantially the same direction as the travel direction of the light L49 with respect to the front direction nd. In this case, most of such light that is incident on the other light outgoing side surface 56b undergoes the total reflection. Then, after subjected to the total reflection, a part of the light, e.g., L49, sometimes outgoes from the second unit shaped element (unit prism 55) at an extremely great output angle. Such light is the so-called "side lobe" light that cannot be effectively used in the transmission-type display device 10, while having a tendency to substantially degrade the picture quality of the image.

According to the aforementioned embodiment, not only the second unit shaped elements 55 but also the first unit shaped elements 50 are provided on the one surface 46 of the main body 45. As shown in FIG. 4, the height H1 of the projection of each of the first unit shaped elements 50 from the main body 45 is set higher than the height H2 of the projection of each of the second unit shaped elements 55 from the main body 45. Thus, the light L49, once having existed from the second unit shaped element (unit prism) 55 at the extremely great output angle, is further incident into the first unit shaped element 50 (see the light L49a), or is reflected on the light outgoing side surface of the first unit shaped element 50 (see the light L49b).

The light L49a incident into the first unit shaped element 50 undergoes a total reflection once or more on the light outgoing side surface formed of the curved surface of the first unit shaped element 50, so that the travel direction of the light L49a may be changed to a reverse side (light source side, light incident side). In particular, in this embodiment, the first unit shaped element 50 has the shape corresponding to a part of a circle or a part of an ellipse, in the main cross section. Further, in the main cross section, the width W1 of the first unit shaped element 50 is longer than the height H1 thereof. Thus, after having been incident into the first unit shaped element 50, the light L49a is then incident on the light outgoing side surface of the first unit shaped element 50 which is extremely largely oblique relative to the normal direction nd. As a result, the light L49a undergoes a total reflection, and has a strong tendency to change its travel direction to the reverse side. The travel direction of such a light L49a may be changed again to the light outgoing side (observer side), by a reflection by the reflector 28 or the like, whereby the light L49a can be reused. Namely, the first unit shaped element 50 serves to collect the light, which once have exited as unnecessary side lobe light, from the optical sheet 40, into the optical sheet 40, and to reuse the light as a light contributable to enhancement of the front brightness.

On the other hand, the travel direction of the light L49b reflected on the light outgoing side surface of the first unit shaped element 50 is changed by the reflection on the first unit shaped element 50. As in the illustrated example, in the case in which the width of the first unit shaped element 50 gradually narrows from the proximal end side (light incident side) toward the distal end side (light outgoing side) of the first unit shaped element 50, the travel direction of the light L49b is changed such that an angle defined by the travel direction relative to the front direction nd is lessened. Namely, the light condensing effect can be exerted on the light L49, which has once exited as unnecessary side lobe light, from the optical sheet 40, so that the light L49b is changed as light near to the normal direction nd.

As described above, it is presumed that the first unit shaped elements 50 arranged at a low filling rate deflect the travel direction of light, which is conventionally generated as unnecessary light caused by the second unit shaped elements 55, such that the light contributes the enhancement of the front brightness. In particular, as in the illustrated example, when the first unit shaped element 50 is larger than the second unit shaped element 55 in height and width, at least some of the plurality of second unit shaped elements 55 are divided by the first unit shaped element 50 in the longitudinal direction of the second unit shaped element 55. According to this embodiment, it is presumed that the first unit shaped element 50 can effectively exhibit the optical function as an optical element discrete from the second unit shaped element 55. Actually, when the brightness angular distribution of the optical sheet 40 according to this embodiment in which the first unit shaped elements 50 were arranged at a low filling rate was measured, there existed no sub peak in a wide angular range which was found in the brightness angular distribution of a conventional prism sheet having only the second unit shaped elements 55. In other words, in the brightness angular distribution of the optical sheet 40 according to this embodiment in which the first unit shaped elements 50 were arranged at a low filling rate, the occurrence of side lobe could be mitigated, or further prevented. Namely, according to the optical sheet 40 of this embodiment, due to not only the optical effects of the independent first unit shaped element 50 and the second unit shaped element 55, but also the combined optical effect of the first unit shaped element 50 and the second unit shaped element 55, it is possible to further enhance the front brightness of the prism sheet, which is regarded to be most capable of enhance the front brightness among the light condensing sheets actually incorporated in the display device.

From the viewpoint of enhancing the front brightness distribution of the optical sheet 40, it was found that the height H2 of the projection of the second unit shaped element 55 was preferably set not more than 1/10 and not less than 9/10 of the height H1 of the projection of the first unit shaped element 50, and was more preferably set not more than 2/3 and not less than 1/3 of the height H1 of the projection of the first unit shaped element 50.

From the earnest experiments conducted by the present inventors, the combined optical function of the first unit shaped elements 50 and the second unit shaped elements 55 can be more effectively exerted, by appropriately controlling the distance between the two adjacent first unit shaped elements 50 as well as suitably adjusting the arrangement pitch P2 of the second unit shaped elements 55. Specifically, it is preferred that an average Sa of the least interval between the first unit shaped elements 50 is equal to or greater than the arrangement pitch P2 of the second unit shaped elements 55, in the direction (i.e., the arrangement direction of the second unit shaped elements 55) orthogonal to the one direction (i.e., the longitudinal direction of each of the second unit shaped elements 55) on the sheet surface of the main body 45. More preferably, the average Sa of the least interval between the first unit shaped elements 50 is equal to or greater than twice the arrangement pitch P2 of the second unit shaped elements 55.

As used herein, the "average Sa of the least interval" means the average of the distance, along the sheet surface of the main body 45, between one of the first unit shaped elements 50 that is optionally selected and the other one of the first unit shaped elements 50 positioned nearest to the one first unit shaped element 50 along the sheet surface of the main body 45. In the aforementioned embodiment, the first unit shaped elements 50, each having the same width (in this example shown in the drawings, the diameter on the one surface 46 of the main body 45) W1, are arranged on the one surface 46 of the main body 45, with the same arrangement pitch P1. Thus, the average Sa of the least interval can be obtained by subtracting the width W1 from the arrangement pitch P1 (i.e., Sa=P1−W1) (see FIG. 2). Meanwhile, in the case in which the first unit shaped elements 50 are arranged in a random arrangement (or in a irregular arrangement) on the one surface 46 of the main body 45, the average Sa of the least interval can be obtained by measuring the distance between the optionally selected one of the first unit shaped elements 50 and another first unit shaped element 50 positioned nearest to the selected one first unit shaped element 50 along the sheet surface of the main body 45, at multiple measurement points, for example, 20 to 100 points, and then calculating the average of the measured values.

On the other hand, in this embodiment, the second unit shaped elements 55 are arranged, without any gap or interval provided therebetween. Therefore, the arrangement pitch P2 of the second unit shaped elements 55 along the direction orthogonal to the one direction on the sheet surface of the main body 45 corresponds to the width W2 of each of the second unit shaped elements 55.

In the case in which the average Sa of the least interval between the first unit shaped elements 50 is equal to or greater than the arrangement pitch P2 of the second unit shaped elements 55, at least one second unit shaped element 55 is necessarily present between the two adjacent unit shaped elements 50 located along the arrangement direction of the second unit shaped elements 55 (i.e., the direction orthogonal to the one direction (see FIG. 3)). In other words, as apparently shown in FIG. 2, such a one second unit shaped element 55 extending without being covered with any one of the first unit shaped elements 50 is present (i.e., a light outgoing side surface corresponding to such a one second unit shaped element 55 can be ensured), between the two adjacent first unit shaped elements 50 located along the direction orthogonal to the one direction. Thus, it is estimated that the second unit shaped element 55 between the two adjacent unit shaped elements 50 exhibits the expected optical function, without being inhibited by the first unit shaped elements 55. When the optical function of the second unit shaped elements 55 is fully exhibited, not only the intrinsic objects, such as enhancement of the front brightness and uniformizing the in-plane distribution of the brightness, can be achieved, but also there is generated the light that travels largely obliquely relative to the normal direction thereby forming a side lobe, as described above. It is estimated that the side lobe light undergoes the aforementioned optical effect from the first unit shaped elements 50 so as to contribute the enhancement in the front brightness. However, the present invention is not limited to the above estimation.

According to this embodiment, the optical sheet 40 includes the three or more first unit shaped elements 50 arranged on the one surface 46 of the main body 45 at a low filling rate, and the second unit shaped elements 55 arranged on the one surface 46 of the main body 45, each extending in parallel with the one direction on the sheet surface of the main body 45. The height H1 of the projection of the first unit shaped element 50 from the one surface 46 is set higher than the height H2 of the projection of the second unit shaped element 55 from the one surface 46. In such an optical sheet 40, there is no possibility that the front brightness obtained by the optical function of the second unit shaped elements 55 is largely lowered by the first unit shaped elements 50 arranged at the low filling rate. In particular, when the filling rate of the first unit shaped elements 50 is greater than 0 and not more than 10%, the front brightness obtained by the optical function of the second unit shaped elements 55 can be maintained, as well as the front brightness obtained by the optical function of the second unit shaped elements 55 can be further enhanced by effectively utilizing the light of the light source. In addition thereto, since the first unit shaped elements 50 having the higher height H1 comes into contact with another member adjacent to the optical sheet 40, there is a space between the second unit shaped elements 55 and the other member, whereby the second unit shaped elements 55 can be prevented from being in contact with the other member adjacent to the optical sheet 40. Thus, while maintaining the scratch resistance of the entire optical sheet 40 by the structure of the first unit shaped elements 50, the shape of each of the second unit shaped elements 55 can be designed depending on desired optical properties, without considering the scratch resistance, e.g., without chamfering the vertex of the second unit shaped element 55. That is to say, according to the optical sheet in this embodiment, it is simultaneously possible to enhance both the front brightness (front direction brightness) of the optical sheet and to enhance the scratch resistance of the optical sheet.

In order to maintain both of the scratch resistance and the front brightness at a high level, the filling rate of the first unit shaped elements is not less than 0.1% and not more than 5%. More preferably, the filling rate is in a range of from 0.3% to 1.5%.

In particular, in the aforementioned embodiment, each of the first unit shaped elements 50 has the light outgoing surface formed of the curved surface. For example, each of the first unit shaped elements 50 has the cross-sectional shape corresponding to a part of a circular shape or an elliptic shape in the main cross section, in the area including the light outgoing side vertex. In addition, the cross-sectional shape of each of the second unit shaped elements 55 in the main cross section is a polygonal shape, e.g., a triangular shape. According to this example, not only that the excellent front brightness can be ensured by the optical effect from the second unit shaped elements 55, but also that the excellent front brightness can be further enhanced in a synergistic manner by the combined optical effect from the first unit shaped elements 50 and the second unit shaped elements 55. At the same time, the contact between the second unit shaped elements 55 and another member is prevented by the first unit shaped elements 50 having the excellent scratch resistance, whereby the second unit shaped elements 55 having the sharp end part can be protected. Thus, it is not necessary to chamfer the vertex of the second unit shaped element, and the second unit shaped element 55 can have the shape pursuit of the optical properties. Namely, due to the function exerted by the structure of the first unit shaped elements 50, the scratch resistance of the entire optical sheet 40 can be improved, as well as the excellent optical function of the optical sheet 40 can be stably exerted. In addition, since the scratch resistance of the optical sheet 40 can be improved, it is possible to exclude a protective sheet which is generally disposed between adjacent optical sheets, when the optical sheets are transported as a member in the overlapped form or a member in the wound form.

Further, since the optical sheet 40 by itself can enhance the front brightness, even when another light diffusing sheet is provided in the surface light source device 20, the front brightness of the light outgoing side surface of the surface light source device 20 can be maintained. That is to say, while maintaining the front brightness on the light outgoing side surface of the surface light source device 20, it is possible to more smoothly change the brightness angular distribution measured on the light outgoing surface of the surface light source device 20, to further uniformize the brightness in-plane distribution, to render the image of the light source 25 inconspicuous, and to increase the angle of visibility of the display device 10.

It is important to note that various changes or modifications can be made to the above embodiment. Hereinafter, one variation of the embodiment will be described.

In the above embodiment, each of the first unit shaped elements 50 having the curved light outgoing side surface has the shape corresponding to a part of a sphere or a part of a spheroid. However, the shape of each of the first unit shaped elements 50 is not limited to this example. For instance, the first unit shaped element may have a shape formed by combining a circular truncated cone projected from the main body 45 and a hemisphere disposed on the circular truncated cone. Further, in the above embodiment, the first unit shaped element 50 has a shape corresponding to a part of a circle or a part of an ellipse, in a cross section along the normal direction nd of the optical sheet 40. However, the shape of each of the first unit shaped elements 50 is not limited to this example. For instance, the first unit shaped element may have a shape formed by combining a trapezoid projected from the main body 45 and a hemisphere disposed on the trapezoid, in the cross section along the normal direction nd of the optical sheet 40. Furthermore, in the above embodiment, the bottom face (the surface connected with the main body 45) of the first unit shaped element 50 has a circular shape (see, FIG. 2, namely, the first unit shaped element 50 is a body of revolution having a rotation axis extending parallel with the normal line nd relative to the sheet surface of the optical sheet 40). However, the shape of the bottom face of the first unit element 50 is not limited to this example. For instance, the bottom face of the first unit shaped element may have an elliptic shape or any other suitable polygonal shape, such as the triangular shape, tetragonal shape, heptagonal shape, hexagonal shape, octagonal shape or the like. Furthermore, in the above embodiment, the first unit shaped elements 50 of the optical sheet 40 have the same configuration. However, the configuration of each of the first unit shaped elements 50 is not limited to this example. For instance, various kinds of first unit shaped elements 50, different from one another, in at least one of the height, cross-sectional shape, bottom face shape and the like, may be included in the optical sheet 40. For example, two or more kinds of hemispherical surfaces having radii of curvature different from one another may be randomly arranged, as the first unit shaped elements on the one surface 46 of the main body (it goes without saying that the second unit shaped elements are arranged between the respective first unit shaped elements). In this case, the light diffusing function can be more enhanced, as compared with the case in which the first unit shaped elements 50 have the same configuration.

In the above embodiment, the first unit shaped elements 50 are arranged, with the constant pitch, along the two directions defining the 60° angle therebetween, on the one surface 46 of the main body 45. However, the arrangement of the first unit shaped elements 50 is not limited to this example. For instance, these first unit shaped elements 50 may be arranged, with the constant pitch, along two directions orthogonal to each other (i.e., the elements may be arranged in a square lattice form), on the one surface 46 of the main body 45. Alternatively, the first unit shaped elements 50 may be arranged in a random manner, on the one surface 46 of the main body 45. As one example of arranging the first unit shaped elements 50, in a random manner, on the one surface 46 of the main body 45, the following one approach can be mentioned. First, for instance, in the same manner as described in the above embodiment, a certain regular arrangement position is provisionally determined, as a reference, for multiple first unit shaped elements, such that the distance or interval between the two adjacent first unit shaped elements can be substantially constant. Then, the first unit shaped elements are shifted with a various length, set for each of the first unit shaped elements to a random value, e.g., shorter than a half of the aforementioned constant interval, and newly positioned on the one surface 46 of the main body 45, while any of the two adjacent first unit shaped elements are not overlapped with each other. Such first unit shaped elements 50 arranged, in a random manner, under certain control, on the one surface 46 of the main body 45, can render the so-called moiré (or interference fringes) attributable to a specific arrangement of the first unit shaped elements 50 more inconspicuous, while adequately preventing the occurrence of the in-plane variation of the brightness that may be caused by excessively uneven arrangement of the first unit shaped elements 50 on the main body 45.

Figure 8:
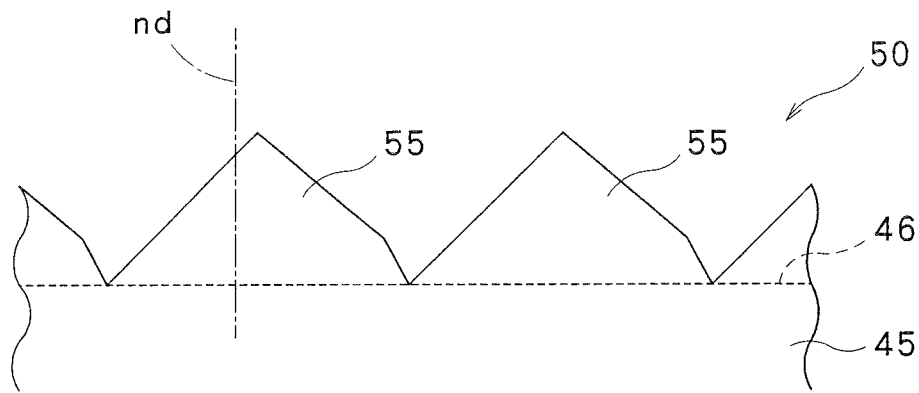
FIG. 8 is a cross section for showing a variation of the second unit shaped elements included in the optical sheet.

Further, in the above embodiment, each of the second unit shaped elements 55 has the isosceles triangular cross-sectional shape. However, the cross-sectional shape of each of the second unit shaped elements 55 is not limited to the isosceles triangular shape. For instance, the cross section of this second unit shaped element 55 may have a properly modified or altered triangular shape specially designed for providing particular and/or desired optical properties to each element 55. More specifically, for appropriately controlling the optical properties, each of the second unit shaped elements 55 may have any suitable triangular or triangle-like cross-sectional shape, such as the triangle having one or more bent sides as shown in FIG. 8, triangle having one or more curved sides (i.e., the so-called fan shape), triangle having a curved or rounded vertex, or triangle having one or more sides, each including a small concavo-convex portion (or portions). Alternatively, each of the second unit shaped elements 55 may have another cross-sectional shape than the triangular cross sections as described above, e.g., various polygonal shapes, such as tetragonal shapes including trapezoids, pentagonal shapes, hexagonal shapes or the like. Furthermore, each of the second unit shaped elements 55 may have a cross section corresponding to the part of the circle or the part of the ellipse.

The object of rounding the vertex (or a portion near thereto) of the triangle as the main cross section of the second unit shaped element 55 of the triangle columnar shape is to intensify the light diffusion effect by the rounded portion (although the front brightness is impaired by the rounded portion) and to enhance a dynamic strength of the vertex (to prevent breakage and damage of the vertex). In order to sufficiently, effectively realize the effect produced by the rounded vertex, the radius of curvature of the rounded portion is not less than 2 μm, preferably, not less than 5 μm. In order to prevent the front brightness from largely decreasing, the radius of curvature of the rounded portion is not more than 12 μm.

On the other hand, in order to sufficiently enjoy the light condensing (collecting) function (enhancement of the front brightness) peculiar to the triangle column, a vertex that is not substantially rounded is employed. The vertex that is not substantially rounded means that the radius of curvature of the vertex of the triangle in the main cross section of the second unit shaped element is less than 2 μm, more preferably, not more than 1 μm. Note that, when the radius of curvature of the vertex is less than a minimum wavelength of an optical spectrum of the light source, the geometrical optical effect by the rounded portion can be practically neglected. Since the minimum wavelength of the visible light is 0.38 μm, when the radius of curvature of the vertex is between about 0.1 and 0.3 μm, the radius of curvature of the vertex can be geometrically regarded as 0 μm. Thus, it is not necessary to further decrease the radius of curvature.

In the above embodiment, all of the second unit shaped elements 55 of the optical sheet 40 have the same configuration. However, the configuration of each of the second unit shaped elements 55 is not limited to this example. For instance, various kinds of second unit shaped elements 55, different from one another, in at least one of the height, cross section and the like, may be included in the optical sheet 40.

Further, in the above embodiment, the adjacent second unit shaped elements 55 are arranged without any space or interval provided therebetween. The arrangement manner of the second unit shaped elements 55 is not limited to this example. For instance, the adjacent second unit shaped elements 55 may be arranged with a proper space or gap provided therebetween. Furthermore, there may be a region, in which none of the first unit shaped elements 50 and second unit shaped elements 55 is arranged, on the one surface 46 of the main body 45.

Additionally, the optical sheet 40 may have some light diffusing function in itself. For instance, the main body 45 may includes an additional light diffusing layer (or intermediate matted layer) between the one surface 46 and the other surface 47 thereof. Such a light diffusing layer (or intermediate matted layer) may be provided as a layer including a base part and a light diffusing agent dispersed in the base part. That is to say, this light diffusing layer containing such a light diffusing agent can exhibit the light diffusing function, by obtaining a light reflecting function exhibited by the light diffusing agent, or by obtaining the refractive index substantially different from the refractive index of the base part due to the presence of the light diffusing agent therein. Alternatively or additionally, the other surface 47 of the main body 45 may be composed of the light diffusing layer (i.e., a rear-face-side matted layer). Such a light diffusing layer (or rear-face-side matted layer) may be provided as a light-diffusing-agent containing layer constructed in the same manner as the aforementioned intermediate matted layer, or otherwise may be another proper layer having a concavo-convex surface formed thereon, such as by embossing and/or hair-line process.

In addition, the optical sheet 40 may include an antistatic layer. Namely, by adding the antistatic layer to the optical sheet 40, an antistatic function can be provided to the entire main body 45. With this variation, attachment of foreign materials, such as dust or the like, to the optical sheet 45 can be substantially reduced. As such, occurrence of negative impact on the optical properties due to such dust or the like can be successfully avoided. Alternatively or additionally, the aforementioned light diffusing layer may also have the antistatic function.

Moreover, the optical sheet 40 may be formed to include an antireflection layer defining a light incident side surface closest to the light source (light incident side surface 41). When the light incident side surface closest to the light source of the optical sheet 40 is formed of the antireflection layer, the utilization efficiency of light can be enhanced. The antireflection layer may be formed as a monolayer (low refractive-index layer) having a refractive index lower than that of a layer adjacent thereto on the light outgoing side (e.g., the main body 45). Alternatively, the antireflection layer may be formed as a composite layer in which a layer having a low refractive index (low refractive-index layer) and a layer having a higher refractive index as compared with the refractive index of the layer having the low refractive index (high refractive-index layer) are alternately arranged, with the layer having the low refractive index (low refractive-index layer) being arranged on the side closest to the light source. Such a low refractive-index layer may be made of, e.g., magnesium fluoride ($MgF_2$), and such a high refractive-index layer may be made of, e.g., zirconium oxide (ZrO). In addition, the antireflection layer may be formed as a moth-eye type layer, which is described in JP50-70040A. Namely, the moth-eye type layer has projections which are projected on the light incident side and arranged at a pitch not more than a light wavelength, with a cross-sectional area of each of the projections becoming gradually smaller toward the light incident side, in a cross section parallel with the sheet surface of the main body 45.

Further, in the above embodiment, the arrangement direction of the elongated second unit shaped elements 55 and the arrangement direction of the elongated light emitting units of the light source 25 are parallel with each other. However, the arrangement manner of these components is not limited to this aspect. For instance, the arrangement direction of the elongated second unit shaped elements 55 and the arrangement direction of the elongated light emitting units of the light source 25 may cross to each other, e.g., orthogonally.

In the above embodiment, each light emitting unit of the light source 25 of the surface light source device 20 is composed of the linear cold-cathode fluorescent lamps. The configuration of each light emitting unit of the light source 25 is not limited to this example. For instance, any other suitable light emitting units, such as the LEDs (Light Emitting Diodes) as the point-like light sources, the planar EL (Electro-luminescent Light source) and the like, may be used as the light source 25. Additionally, in the above embodiment, the optical sheet 40 is applied to the direct-type surface light source device 20. However, the application of this optical sheet 40 is not limited to this example. For instance, this optical sheet 40 may be applied to the edge-light type (or also referred to as the side-light type) surface light source device. In this application, the optical sheet 40 can also exhibit substantially the same function as in the case in which the sheet 40 is applied to the direct-type surface light source 20.

Further, in the above embodiment, although one example of the general construction of the surface light source device 20 and transmission-type display device 10, in which the optical sheet 40 is incorporated, has been described, the construction of such related devices is not limited to this aspect. For instance, the polarized-light separating film 35 and/or the light diffusing sheet 38 may be deleted or replaced with another member. Otherwise, another sheet-like member, such as a light condensing sheet, may be additionally incorporated in the surface light source device 20 and/or transmission-type display device 10.

Furthermore, in order to enhance the front brightness of the optical sheet 40, the refractive index of the cured ionizing-radiation-curing resin is preferably high. Thus, it is preferable to select the ionizing-radiation-curing resin having the refractive index of not less than 1.55, more preferably, not less than 1.58. In order to elevate the refractive index of the cured ionizing-radiation-curing resin made of an acrylate (methacrylate) compound, the ionizing-radiation-curing resin may include a composition containing orthophenoxy acrylate.

While several variations of the aforementioned embodiment have been shown and described, it should be appreciated that any suitable combination of such variations can also be applied to the above related devices.

EXAMPLES

Hereinafter, the present invention will be described in more detail about several examples. However, it should be noted that this invention is not in any way limited to these examples.
(First Investigation)
At first, the brightness in the front direction (front brightness) on the light outgoing side of an optical sheet having the same configuration as that of the above embodiment was investigated by simulation. In this simulation, the filling rate of the optical sheet was varied, and the variation of the front brightness in accordance with the variation of the filing rate was investigated.

The simulated optical sheet included a main body, at least three or more first unit shaped elements arranged on one surface of the main body so as to constitute a fly-eye lens, and second unit shaped elements arranged on the one surface of the main body, each extending in parallel with the one direction on a sheet surface of the main body. A height of each of the first unit shaped elements from the one surface was set higher than a height of each of the second unit shaped elements from the one surface. In addition, the one surface of the main body was entirely covered with any of the first unit shaped elements and the second unit shaped elements.

Figure 10:
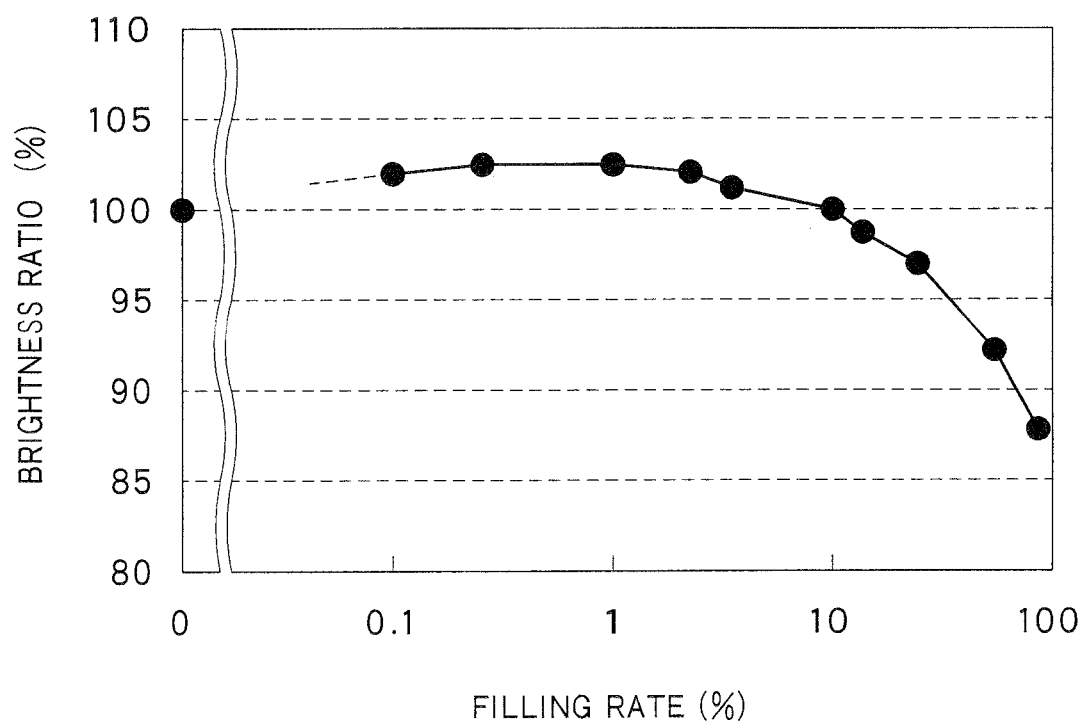
FIG. 10 is a graph showing a result of a simulation conducted for examining the relationship between a filling rate and a brightness in a front direction.

FIG. 10 shows a typical example of the simulation results. FIG. 10 shows the result of an investigation which was conducted on the plurality of optical sheets having the same conditions of the structure (shape and dimension) of the unit shaped elements, but the filling rate were differed from each other. In addition, FIG. 10 shows the result of the investigation which was conducted under the same conditions such as a light source and so on, but the different optical sheets were used. The result shown in FIG. 10 is a result of the optical sheet in which the cross-sectional shape of the first unit shaped element, the cross-sectional shape of the second unit shaped elements, and the arrangement manner thereof, were the same with those of the above-described embodiment. Namely, in this simulation, each of the first unit shaped elements had a shape including a part of a sphere or a spheroid, and each of the second unit shaped elements had a cross-sectional shape of an isosceles right triangle.

The graph shown as the result of the simulation in FIG. 10 is a semilogarithmic graph in which the axis of ordinate shows the front brightness ratio (front luminance ratio) (%) and the axis of abscissa as a logarithm shows the filling rate (%). The brightness ratio is a rate relative to a front brightness that was investigated on an optical sheet (so-called prism sheet) in which only the second unit shaped elements were arranged on the one surface of the main body and a filling rate of which was 0%. Namely, such an optical sheet was different in structure from the other optical sheets that were simulated, only in that the first unit shaped elements were not arranged.

As shown in FIG. 10, there was a general tendency in which, when the filling rate decreased, the front brightness ratio increased so as to converge on 100%. More precisely, in the area in which the filling rate was not low, the data obtained as the simulation results were plotted on the graph such that there was defined an asymptote in which the value of the brightness ratio gradually converges on 100% as the filling rate approached 0%. Note that, in FIG. 10, although the data in the low filling rate area are shown in detail by using the semilogarithmic graph, when the data obtained as the simulation results are plotted in a general graph, such an asymptote can be more clearly confirmed.

On the other hand, the area in which the filling rate was low showed a somewhat different tendency from that of the other area. More specifically, in the simulation result in the area at the low filling rate, as the filling rate decreased, the brightness ratio was once away from the asymptote on the graph, and thereafter, the brightness ratio approached 100% along a course different from the asymptote. In the graph of FIG. 10, the brightness ratio in the low filling rate area obtained as the simulation result is shifted from the asymptote on the side in which the brightness ratio is high. In particular, in the area in which the filling rate is not more than 10%, the brightness ratio obtained as the simulation result is 100% or more. Namely, FIG. 10 shows the result in which there was assured the front brightness equal to or more than the front brightness, which was obtained when the optical sheet (so-called prism sheet) in which only the second unit shaped elements were arranged on the one surface of the main body was used.

<Second Investigation>

Next, transmission type display devices according to Examples 1 to 5 and transmission-type display devices according to Comparative Example 1 and Comparative Example 2 were actually manufactured, and the front brightness (front luminance) and the scratch resistance of the thus manufactured transmission-type display devices were evaluated.

(Structure of Transmission-Type Display Device)

Figure 9:
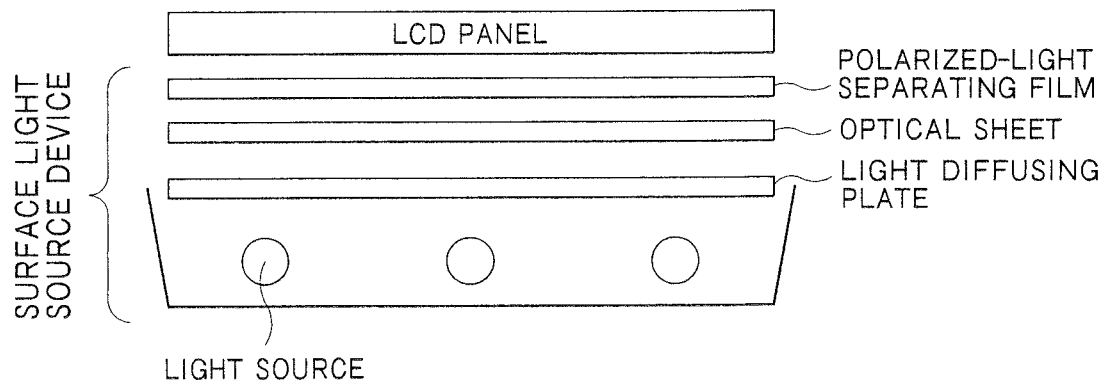
FIG. 9 is a diagram corresponding to FIG. 1 and is a diagram for explaining a construction of the transmission-type display devices related to Examples and Comparative Examples.

Similarly to the above embodiment, the transmission-type display devices according to Examples 1 to 5 and the transmission-type display devices according to Comparative Example 1 and Comparative Example 2 were structured so as to include a surface light source device and a liquid crystal display panel (transmission-type display unit). As shown in FIG. 9, in the transmission-type display devices according to Examples 1 to 5 and the transmission-type display devices according to Comparative Example 1 and Comparative Example 2, similarly to the above-described embodiment, the surface light source device included a light source having cold-cathode fluorescent lamps extending linearly, a reflector surrounding the light source, a light diffusing sheet arranged on the light outgoing side of the light source, an optical sheet arranged on the light outgoing side of the light diffusing sheet, and a polarized-light separating film arranged on the light outgoing side of the optical sheet . In the transmission-type display devices according to Examples 1 to 5 and the transmission-type display devices according to Comparative Example 1 and Comparative Example 2, the members used in the surface light source devices, other than the optical sheet, were the same with each other. In addition, in the transmission-type display device according to Examples 1 to 5 and the transmission-type display devices according to Comparative Example 1 and Comparative Example 2, the same liquid crystal display panels were used.

Each of the light diffusing sheets were formed of a base part and light diffusing particles having a refractive index different from that of the base part and dispersed in the base part. Each of the polarized-light separating film was formed of a "DBEF®" film available from the US-3M Corporation. There were used the members, other than the optical sheets, i.e., the light diffusing sheets, the polarized-light separating films, the light sources, the reflector and the transmission-type display units, which were incorporated in commercially available liquid crystal display devices.

In the transmission-type display devices according to Examples 1 to 5 and the transmission-type display device according to Comparative Example 2, similarly to the optical sheet in the above-described embodiment, each of the optical sheets were structured so as to include a sheet-like main body, first unit shaped elements arranged on one surface of the main body so as to constitute a fly-eye lens, and second unit shaped elements arranged on the one surface of the main body, each extending in parallel with one direction on a sheet surface of the main body. On the other hand, the optical sheet of the transmission-type display device according to Comparative Example 1 differed from the optical sheets of the other transmission-type display devices, in that the first shaped unit elements were not provided.

In optical sheets of the transmission-type display devices according to Examples 1 to 5 and the transmission-type display device according to Comparative Example 2, the arrangement of the first unit shaped elements were the same as the arrangement (see FIG. 2) described in the above embodiment. Each of the first unit shaped elements had a hemispherical shape. In the optical sheets of the transmission-type display devices according to Examples 1 to 5 and the transmission-type display devices according to Comparative Example 1 and Comparative Example 2, the arrangement direction of the second unit shaped elements and the arrangement direction of the cold-cathode fluorescent lamps of the light source were in parallel with each other. In addition, in the optical sheets of the respective transmission-type display devices, the second unit shaped elements were arranged along their arrangement direction without any interval or gap provided therebetween. In addition, in the optical sheets of the respective transmission-type display devices, each of the second unit shaped elements had a cross-sectional shape of an isosceles right triangle that was symmetrically arranged with the front direction as a center. The vertex of the cross-sectional shape of the isosceles right triangle was not chamfered.

Shape dimensions and arrangement interval of the unit shaped elements in the optical sheets of the respective transmission-type display devices are shown in Table 1. In Table 1, "refractive index" is a refractive index of a material forming the first unit shaped elements and the second unit shaped elements. "W1" in Table 1 is a value of a diameter of the circle forming the bottom face of the first unit shaped element on the main body, i.e., "W1" is a dimension corresponding to W1 shown in FIGS. 2 and 4. "H1" and "H2" in Table 1 are respectively the height of the first unit shaped element and the height of the second unit shaped element from the main body along the normal direction, i.e., "H1" and "H2" are dimensions corresponding to H1 and H2 shown in FIG. 4. "Filling rate" in Table 1 is a rate of an area occupied by the first unit shaped elements on the one surface of the main body, when the optical sheet is observed from the light outgoing side along the normal direction nd. "Vertex R" in Table 1 is a size of a radius of a rounded portion formed on the vertex of the triangle defining the cross-sectional shape of the second unit shaped element in the main cross section ("Vertex Angle R" corresponds to a chamfered portion R formed depending on manufacturing conditions and the like). "P2" in Table 1. is a size of an arrangement pitch of the second unit shaped elements along the arrangement direction of the second unit shaped elements, i.e., "P2" is a dimension corresponding to P2 shown in FIGS. 2 and 4.

<Evaluation>

(Evaluation Method 1)

While white color was displayed on the entire display units, the front brightnesses (the luminances in the front direction) (cd/m$^2$) of the transmission-type display devices according to Examples 1 to 5 and the transmission-type display devices according to Comparative Example 1 and Comparative Example 2 were measured. BM-7 manufactured by TOPCON company was used for measuring the brightness. The brightness measurement results are shown in Table 1. In Table 1, ratios of the measured values of the respective transmission-type display devices relative to the measured value of the transmission-type display device of Comparative Example 1 are shown in percent figures. The front brightnesses of the transmission-type display devices according to Examples 1 to 5 were equal to or more than the front brightness of the transmission-type display device according to Comparative Example 1. In addition, it was confirmed that the relationship between the front brightness and the filling rate in the simulation result shown in the aforementioned FIG. 10 and the relationship between the front brightness and the filing rate which were actually measured in Table 1 had the same tendency.

(Evaluation Method 2)

The following scratch resistance test was conducted on the respective optical sheets of the transmission-type display devices according to Examples 1 to 5 and the transmission-type display devices according to Comparative Example 1 and Comparative Example 2. At first, a sheet-like frictional object was placed on the surface from which the unit shaped elements of the optical sheet were projected. The frictional object was a sheet-like member (lower polarizing film H25 manufactured by DNP) incorporated in the transmission-type display device. The sheet-like member was placed such that a matted surface thereof was in contact with the optical sheet. A weight of 300 g was positioned on the frictional object at a portion having a surface area of 3.14 mm$^2$. From this state, the optical sheet was swept with respect to the frictional object on which the weight was positioned, whereby the optical sheet was relatively moved with respect to the frictional object. The optical sheet was swept at a speed of 2000 m/min, in a direction parallel with the arrangement direction of the second unit shaped elements. The sweeping was reciprocated 1.5 times over a section of 5 cm. After the weight and the frictional object had been removed, whether a visible scratch was formed or not in the optical sheet was confirmed. As shown in Table 1, no scratch was formed in the optical sheets of the transmission-type display devices according to Examples 1 to 5 and the transmission-type display device according to Comparative Example 2. On the other hand, conspicuous scratches were formed in the optical sheet of the transmission-type display device according to Comparative Example 1.

TABLE 1

Evaluation of Front Brightness and Scratch Resistance

| | | First Unit Shaped Element | | | Second Unit Shaped Element | | | Test Result | |
|---|---|---|---|---|---|---|---|---|---|
| | | | | Filling | Vertex | | | | |
| | Refractive Index | W1 (μm) | H1 (μm) | Rate (%) | Angle R (μm) | H2 (μm) | P2 (μm) | Brightness (%) | Scratch Resistance |
| Example 1 | 1.59 | 100 | 40 | 0.3 | 0.1 | 25 | 50 | 103 | ○ |
| Example 2 | 1.59 | 100 | 40 | 1.5 | 0.5 | 25 | 50 | 103 | ○ |
| Example 3 | 1.59 | 100 | 40 | 10 | 0.5 | 25 | 50 | 100 | ○ |
| Example 4 | 1.59 | 120 | 48 | 0.3 | 0.2 | 30 | 60 | 105 | ○ |
| Example 5 | 1.59 | 140 | 56 | 0.3 | 0.2 | 35 | 70 | 106 | ○ |
| Comparative Example 1 | 1.59 | — | — | — | 0.1 | 25 | 50 | 100 | X |
| Comparative Example 2 | 1.59 | 100 | 40 | 25 | 0.2 | 25 | 50 | 97 | ○ |

The invention claimed is:

1. An optical sheet comprising:
   a sheet-like main body;
   at least three or more first unit shaped elements arranged on one surface of the main body; and
   second unit shaped elements arranged on the one surface of the main body, each extending in parallel with one direction on a sheet surface of the main body;
   wherein:
   a height of each of the first unit shaped elements from the one surface is higher than a height of each of the second unit shaped elements;
   a height of a projection of each first unit shaped element from the one surface of the main body is higher than a height of a projection of each second unit shaped element from the one surface of the main body, and a width of each first unit shaped element along an arrangement direction of the second unit shaped elements is wider than a width of each second unit shaped element along the arrangement directon of the second unit shaped elements so that at least part of the second unit shaped elements are divided into sections by the first unit shaped elements; and
   a rate of an area occupied by the first unit shaped elements on the one surface is not more than 10.0%, when observed along a normal direction relative to the one surface.

2. The optical sheet according to claim 1, wherein each of the first unit shaped elements includes a shape corresponding to a part of an ellipse or to a part of a circle, in a section thereof parallel with the normal direction relative to the sheet surface of the main body and orthogonal to the one direction.

3. The optical sheet according to claim 1, wherein each of the second unit shaped elements has a triangular shape, in a section thereof parallel with the normal direction relative to the sheet surface of the main body and orthogonal to the one direction.

4. The optical sheet according to claim 1, wherein each of the first unit shaped elements has a shape corresponding to a part of a spheroid, or a shape corresponding to a part of a sphere.

5. A surface light source device comprising:
   a light source; and
   the optical sheet according to claim 1 and arranged to receive light emitted from the light source.

6. The surface light source device according to claim 5, further comprising a polarized-light separating film located on a light outgoing side relative to the optical sheet.

7. A transmission-type display device, comprising:
   a transmission-type display unit; and
   the surface light source device according to claim 5 disposed to be opposed to the transmission-type display unit.

* * * * *